(12) United States Patent
O'Brien et al.

(10) Patent No.: US 8,173,265 B2
(45) Date of Patent: May 8, 2012

(54) COATING COMPOSITIONS FOR CANS AND METHODS OF COATING

(75) Inventors: Robert M. O'Brien, Monongahela, PA (US); Daniel E. Rardon, Pittsburgh, PA (US); Rachael Ann Spynda, Wexford, PA (US); George K. Bartley, III, Burgettstown, PA (US); Richard H. Evans, Wexford, PA (US); Howard Killilea, North Oaks, MN (US); Carl Cavallin, Albertville, MN (US); Bruce G. Sicklesteel, Schaumburg, IL (US)

(73) Assignee: Valspar Sourcing, Inc., Minneapolis, MN (US)

( * ) Notice: Subject to any disclaimer, the term of this patent is extended or adjusted under 35 U.S.C. 154(b) by 80 days.

(21) Appl. No.: 12/505,250

(22) Filed: Jul. 17, 2009

(65) Prior Publication Data

US 2010/0075084 A1 Mar. 25, 2010

Related U.S. Application Data

(63) Continuation-in-part of application No. 11/253,161, filed on Oct. 18, 2005, now Pat. No. 7,592,047.

(60) Provisional application No. 60/620,639, filed on Oct. 20, 2004.

(51) Int. Cl.
*B32B 15/08* (2006.01)
*B32B 27/00* (2006.01)

(52) U.S. Cl. .................. 428/463; 428/457; 428/461

(58) Field of Classification Search .................. 428/457, 428/461, 463
See application file for complete search history.

(56) References Cited

U.S. PATENT DOCUMENTS

| | | | |
|---|---|---|---|
| 2,633,458 A | 3/1953 | Shokal et al. |
| 3,242,123 A | 3/1966 | Mayfield et al. |
| 3,335,119 A | 8/1967 | D'Alelio |
| 3,377,406 A | 4/1968 | Newey et al. |
| 3,390,206 A | 6/1968 | Morice et al. |
| 3,477,990 A | 11/1969 | Dante et al. |
| 3,479,310 A | 11/1969 | Dieterich et al. |
| 3,547,881 A | 12/1970 | Mueller et al. |
| 3,547,885 A | 12/1970 | Dante et al. |
| 3,694,407 A | 9/1972 | Krikorian et al. |
| 3,738,862 A | 6/1973 | Klarquist et al. |
| 3,810,859 A | 5/1974 | Mikofalvy |
| 3,862,914 A | 1/1975 | Anderson et al. |
| 3,880,793 A | 4/1975 | Nakayama |
| 3,933,706 A | 1/1976 | Momiyama et al. |
| 3,943,187 A | 3/1976 | Wu |
| 3,948,855 A | 4/1976 | Perry |
| 3,969,300 A | 7/1976 | Nagata et al. |
| 3,991,216 A | 11/1976 | Christenson et al. |
| 3,997,694 A | 12/1976 | Wu |
| 4,021,396 A | 5/1977 | Wu |
| 4,028,294 A | 6/1977 | Brown et al. |
| 4,033,920 A | 7/1977 | Isozaki et al. |
| 4,048,141 A | 9/1977 | Doorakian et al. |
| 4,064,087 A | 12/1977 | Das |
| 4,073,775 A | 2/1978 | Matsuo et al. |
| 4,076,676 A | 2/1978 | Sommerfeld |
| 4,100,127 A | 7/1978 | Fukusaki et al. |
| 4,122,052 A | 10/1978 | Aihara et al. |
| 4,144,155 A | 3/1979 | Araki et al. |
| 4,147,679 A | 4/1979 | Scriven et al. |
| 4,151,143 A | 4/1979 | Blank et al. |
| 4,212,776 A | 7/1980 | Martinez et al. |
| 4,212,781 A | 7/1980 | Evans et al. |
| 4,247,439 A | 1/1981 | Matthews et al. |
| 4,247,659 A | 1/1981 | Sekmakas et al. |
| 4,285,847 A | 8/1981 | Ting |
| 4,289,674 A | 9/1981 | Christenson et al. |
| 4,289,811 A | 9/1981 | Shelley, Jr. |
| 4,294,737 A | 10/1981 | Sekmakas et al. |
| 4,296,011 A | 10/1981 | Sekmakas et al. |
| 4,303,488 A | 12/1981 | Seiler et al. |
| 4,304,701 A | 12/1981 | Das et al. |
| 4,337,185 A | 6/1982 | Wessling et al. |
| 4,370,446 A | 1/1983 | Toyoda et al. |
| 4,404,336 A | 9/1983 | Sekmakas et al. |
| 4,413,015 A | 11/1983 | Anderson et al. |
| 4,423,165 A | 12/1983 | Harper et al. |
| 4,425,451 A | 1/1984 | Sekmakas et al. |
| 4,440,897 A | 4/1984 | Maska |
| 4,442,246 A | 4/1984 | Brown et al. |
| 4,443,568 A | 4/1984 | Woo |
| 4,444,923 A | 4/1984 | McCarty |
| 4,446,258 A | 5/1984 | Chu et al. |
| 4,461,857 A | 7/1984 | Sekmakas et al. |
| 4,476,262 A | 10/1984 | Chu et al. |
| 4,477,609 A | 10/1984 | Aluotto et al. |
| 4,480,058 A | 10/1984 | Ting et al. |

(Continued)

FOREIGN PATENT DOCUMENTS

EP 2042535 A1 4/2009

(Continued)

OTHER PUBLICATIONS

Information Offer Form, submitted Mar. 26, 2010 to the Commissioner of the Japanese Patent Office, regarding Japanese Patent Application 2007-538035 (15 pages), translation of Japanese into English.

ASTM International, Designation: D 1200-94 (Reapproved 2005), Standard Test Method for Viscosity by Ford Viscosity Cup, Published Jun. 2005 (4 pages).

ASTM International, Designation: D 2196-05, Standard Test Methods for Rheological Properties of Non-Newtonian Materials by Rotational (Brookfield type) Viscometer, Published Aug. 2005 (5 pages).

ASTM International, Designation: D 5402-93 (Reapproved 1999), Standard Practice for Assessing the Solvent Resistance of Organic Coatings Using Solvent Rubs, Published Jul. 1993 (3 pages).

ASTM International, Designation: D 3359-02, Standard Test Methods for Measuring Adhesion by Tape Test, Published Oct. 2002 (7 pages).

(Continued)

*Primary Examiner* — Michael C Miggins

(57) ABSTRACT

A coating composition for a food or beverage can that includes an emulsion polymerized latex polymer formed by combining an ethylenically unsaturated monomer component with an aqueous dispersion of a water-dispersible polymer.

21 Claims, No Drawings

U.S. PATENT DOCUMENTS

| | | | |
|---|---|---|---|
| 4,482,673 A | 11/1984 | Brown et al. |
| 4,487,861 A | 12/1984 | Winner |
| 4,497,946 A | 2/1985 | Sekmakas et al. |
| 4,501,831 A | 2/1985 | Chu et al. |
| 4,507,425 A | 3/1985 | Weaver |
| 4,539,348 A | 9/1985 | Gajria et al. |
| 4,546,014 A | 10/1985 | Gajria et al. |
| 4,560,714 A | 12/1985 | Gajria et al. |
| 4,572,610 A | 2/1986 | Krajewski |
| 4,579,888 A | 4/1986 | Kodama et al. |
| 4,585,814 A | 4/1986 | Sekmakas et al. |
| 4,600,737 A | 7/1986 | Georgalas et al. |
| 4,623,680 A | 11/1986 | Azarnia et al. |
| 4,629,491 A | 12/1986 | Swerdloff et al. |
| 4,638,020 A | 1/1987 | Christenson et al. |
| 4,644,030 A | 2/1987 | Loewrigkeit et al. |
| 4,647,612 A | 3/1987 | Ranka et al. |
| 4,683,273 A | 7/1987 | Bode |
| 4,692,491 A | 9/1987 | Ranka et al. |
| 4,703,071 A | 10/1987 | Owens |
| 4,741,961 A | 5/1988 | Frisch et al. |
| 4,871,810 A | 10/1989 | Saltman |
| 4,898,911 A | 2/1990 | Miyashita |
| 4,943,359 A | 7/1990 | Patzschke et al. |
| 4,946,911 A | 8/1990 | Treybig |
| 4,963,602 A | 10/1990 | Patel |
| 4,997,865 A | 3/1991 | Scherping et al. |
| 5,051,470 A | 9/1991 | Woo et al. |
| 5,068,266 A | 11/1991 | Kojima et al. |
| 5,082,742 A | 1/1992 | Padwa |
| 5,093,392 A | 3/1992 | Woo et al. |
| 5,096,992 A | 3/1992 | Ross et al. |
| 5,116,888 A | 5/1992 | Woo et al. |
| 5,157,078 A | 10/1992 | Woo et al. |
| 5,166,289 A | 11/1992 | Yezrielev et al. |
| 5,173,526 A | 12/1992 | Vijayendran et al. |
| 5,177,129 A | 1/1993 | Bobo, Jr. |
| 5,196,481 A | 3/1993 | Owens et al. |
| 5,201,436 A | 4/1993 | Owens et al. |
| 5,212,241 A | 5/1993 | Woo et al. |
| 5,252,637 A | 10/1993 | Craun et al. |
| 5,252,669 A | 10/1993 | Maska et al. |
| 5,264,469 A | 11/1993 | Mysliwczyk et al. |
| 5,270,356 A | 12/1993 | Katamoto et al. |
| 5,290,828 A | 3/1994 | Craun et al. |
| 5,296,525 A | 3/1994 | Spencer |
| 5,342,864 A | 8/1994 | Craun et al. |
| 5,344,858 A | 9/1994 | Hart et al. |
| 5,387,625 A | 2/1995 | Parekh et al. |
| 5,428,084 A | 6/1995 | Swarup et al. |
| 5,464,885 A | 11/1995 | Craun |
| 5,500,463 A | 3/1996 | Nishimura et al. |
| 5,504,145 A | 4/1996 | Treasurer |
| 5,508,325 A | 4/1996 | Craun et al. |
| 5,527,840 A | 6/1996 | Chutko et al. |
| 5,532,297 A | 7/1996 | Woo et al. |
| 5,554,671 A | 9/1996 | Craun et al. |
| 5,576,063 A | 11/1996 | Briggs et al. |
| 5,576,361 A | 11/1996 | Craun |
| 5,672,653 A | 9/1997 | Frisch et al. |
| 5,686,511 A | 11/1997 | Bobo |
| 5,723,555 A | 3/1998 | Swarup et al. |
| 5,733,970 A | 3/1998 | Craun |
| 5,739,215 A | 4/1998 | Westerhof et al. |
| 5,767,175 A | 6/1998 | Kamekura et al. |
| 5,780,532 A | 7/1998 | Noda et al. |
| 5,792,804 A | 8/1998 | Cibura et al. |
| 5,811,484 A | 9/1998 | Wilfinger et al. |
| 5,830,952 A | 11/1998 | Pedersen et al. |
| 5,840,384 A | 11/1998 | Noda et al. |
| 5,869,552 A | 2/1999 | Pedersen et al. |
| 5,869,568 A | 2/1999 | Maeda |
| 5,877,239 A | 3/1999 | Craun et al. |
| 5,891,515 A | 4/1999 | Dutheil et al. |
| 5,898,049 A | 4/1999 | Müller et al. |
| 5,907,012 A | 5/1999 | Voss et al. |
| 5,922,817 A | 7/1999 | Pedersen et al. |
| 5,939,482 A | 8/1999 | Kriessmann et al. |
| 5,942,563 A | 8/1999 | DeGraaf |
| 5,962,620 A | 10/1999 | Reich et al. |
| 5,972,432 A | 10/1999 | Chutko et al. |
| 5,976,615 A | 11/1999 | Menovcik et al. |
| 5,976,700 A | 11/1999 | Chutko et al. |
| 5,993,972 A | 11/1999 | Reich et al. |
| 6,008,273 A | 12/1999 | Leibelt et al. |
| 6,040,062 A | 3/2000 | McGee et al. |
| 6,046,256 A | 4/2000 | Nakamura et al. |
| 6,048,924 A | 4/2000 | Obayashi et al. |
| 6,054,208 A | 4/2000 | Rega et al. |
| 6,087,417 A | 7/2000 | Stevenson et al. |
| 6,126,999 A | 10/2000 | Tomasino et al. |
| 6,136,927 A | 10/2000 | Swarup et al. |
| 6,262,217 B1 | 7/2001 | Tallmadge et al. |
| 6,300,428 B1 | 10/2001 | Stevenson et al. |
| 6,306,934 B1 | 10/2001 | Bode et al. |
| 6,339,125 B1 | 1/2002 | Bechara et al. |
| 6,359,062 B1 | 3/2002 | Mallen |
| 6,429,254 B2 | 8/2002 | Schafheutle et al. |
| 6,458,468 B1 | 10/2002 | Moskala et al. |
| 6,465,559 B1 | 10/2002 | Bechara et al. |
| 6,495,643 B1 | 12/2002 | Evans et al. |
| 6,514,619 B2 | 2/2003 | Shimada et al. |
| 6,576,689 B2 | 6/2003 | Noda et al. |
| 6,627,316 B1 | 9/2003 | Matsuki et al. |
| 6,831,136 B2 | 12/2004 | Chao et al. |
| 7,189,787 B2 | 3/2007 | O'Brien et al. |
| 7,375,174 B2 | 5/2008 | Ramesh et al. |
| 7,459,167 B1 | 12/2008 | Sengupta et al. |
| 7,479,519 B2 | 1/2009 | Krishnan |
| 7,534,830 B2 | 5/2009 | Williams |
| 2003/0069380 A1 | 4/2003 | Flat et al. |
| 2004/0167252 A1 | 8/2004 | Melchiors et al. |
| 2005/0084686 A1 | 4/2005 | Imaizumi |
| 2005/0182155 A1 | 8/2005 | O'Dell et al. |
| 2005/0192400 A1 | 9/2005 | Killilea et al. |
| 2007/0027249 A1 | 2/2007 | Killilea |
| 2007/0031679 A1 | 2/2007 | Ushida et al. |
| 2007/0087146 A1 | 4/2007 | Evans et al. |
| 2008/0009601 A1 | 1/2008 | Killilea et al. |
| 2008/0166485 A1 | 7/2008 | Steenwinkel et al. |

FOREIGN PATENT DOCUMENTS

| | | |
|---|---|---|
| GB | 1513866 A | 6/1978 |
| GB | 2152065 A | 7/1985 |
| JP | 5397083 | 8/1978 |
| JP | 62184004 A | 8/1987 |
| JP | 5043830 A | 2/1993 |
| JP | 673308 | 3/1994 |
| JP | 10139839 | 5/1998 |
| JP | 10158528 H | 6/1998 |
| JP | 2002138245 | 5/2002 |
| JP | 2002155234 A | 5/2002 |
| JP | 2003321646 A | 11/2003 |
| JP | 2004026913 | 1/2004 |
| JP | 2005089716 | 4/2005 |
| JP | 2005179491 | 7/2005 |
| JP | 2006077049 | 3/2006 |
| JP | 2007238698 | 9/2007 |
| JP | 2008297379 A | 12/2008 |
| WO | 9308154 A1 | 4/1993 |
| WO | 0192366 A1 | 12/2001 |
| WO | 03076530 A2 | 9/2003 |
| WO | 2004055086 A1 | 7/2004 |
| WO | 2004090020 A1 | 10/2004 |
| WO | 2010066902 A1 | 6/2010 |

OTHER PUBLICATIONS

Guidelines for Industry, "Preparation of Food Contact Notifications and Food Additive Petitions for Food Contact Substances: Chemistry Recommendations," Center for Food Safety and Applied Nutrition, Apr. 2002, Retrieved on Apr. 19, 2006. Retrieved from Internet: <URL: http://www.cfsan.fda.gov/~dms/opa2pninc.html> (37 pages).

21 C.F.R. §175.300 Resinous and Polymeric Coatings: Retrieved on Apr. 19, 2006. Retrieved from Internet: <URL: http://a257.g.akamaitech.net/7/257/2422/01apr20051500/edocket.access.gpo.gov/cfr_2005...> (27 pages).

Niangui, et al., "Synthesis of Glycidyl Methacrylate," *Thermosetting Resin*, Jan. of 2002, vol. 17, No. 1, p. 27-28, (2 pages) [English-language abstract at p. 28].

Chattopadhyay, et al., "Effect of Chain Extender on Phase Mixing and Coating Properties of Polyurethane Ureas," *Ind. Eng. Chem. Res.*, 2005, vol. 44, p. 1772-1779 (8 pages).

Szycher, et al., "Development of an Aliphatic Biomedical-Grade Polyurethane Elastomer," Journal of Elastomers and Plastics, 1983, vol. 15, p. 81-95 (16 pages).

International Search Report and Written Opinion for PCT/US2005/137750 dated Mar. 22, 2006 (10 pages).

International Preliminary Report on Patentability PCT/US2005/137750 dated Feb. 1, 2007 (6 pages).

An Office communication for co-pending U.S. Appl. No. 12/505,236 mailed on May 11, 2011 (5 pages).

English-language translation of an Official Action from the Japanese Patent Office dated Feb. 23, 2011 for corresponding Japanese Application No. 2007-538035 (2 pages).

Science IP Request Form for search topic Bis-4-hydroxy benzoates of various diols dated Jul. 8, 2005, and results of search, "87876—Glycol Bix(4-hydroxybenzoates)," dated Jul. 13, 2005, 55 pages.

COATING COMPOSITIONS FOR CANS AND METHODS OF COATING

CROSS-REFERENCE TO RELATED APPLICATIONS

The present application is a continuation-in-part of U.S. application Ser. No. 11/253,161, filed Oct. 18, 2005, now U.S. Pat. No. 7,592,047, which claims priority to U.S. Provisional Patent Application Ser. No. 60/620,639, filed Oct. 20, 2004, each of which is incorporated herein by reference in its entirety.

BACKGROUND

A wide variety of coatings have been used to coat the surfaces of packaging articles (e.g., food and beverage cans). For example, metal cans are sometimes coated using "coil coating" or "sheet coating" operations, i.e., a planar coil or sheet of a suitable substrate (e.g., steel or aluminum metal) is coated with a suitable composition and hardened (e.g., cured). The coated substrate then is formed into the can end or body. Alternatively, liquid coating compositions may be applied (e.g., by spraying, dipping, rolling, etc.) to the formed article and then hardened (e.g., cured).

Packaging coatings should preferably be capable of high-speed application to the substrate and provide the necessary properties when hardened to perform in this demanding end use. For example, the coating should be safe for food contact, have excellent adhesion to the substrate, and resist degradation over long periods of time, even when exposed to harsh environments.

Many current packaging coatings contain mobile or bound bisphenol A ("BPA") or aromatic glycidyl ether compounds or PVC compounds. Although the balance of scientific evidence available to date indicates that the small trace amounts of these compounds that might be released from existing coatings does not pose any health risks to humans, these compounds are nevertheless perceived by some people as being potentially harmful to human health.

From the foregoing, it will be appreciated that what is needed in the art is a packaging container (e.g., a food or beverage can) that is coated with a composition that does not contain extractable quantities of such compounds.

SUMMARY

This invention provides a coating composition for a food or beverage can that includes an emulsion polymerized latex polymer. This polymer is preferably formed by combining an ethylenically unsaturated monomer component with an aqueous dispersion of a salt of an acid- or anhydride-functional polymer (i.e., an acid group- or anhydride group-containing polymer) and an amine, preferably, a tertiary amine, and then polymerizing the monomer component. In other embodiments, the latex polymer is alternatively formed by combining the ethylenically unsaturated monomer component with an aqueous dispersion of a polymer salt or other water-dispersible polymer, which may or may not include neutralized acid or anhydride groups. For example, the water-dispersible polymer may include any suitable water-dispersing groups, such as anionic salt groups, cationic salt groups, non-ionic water-dispersing groups, or combinations thereof, to facilitate formation of a stable aqueous dispersion.

The ethylenically unsaturated monomer component is preferably a mixture of monomers. In some embodiments, at least one of the monomers in the mixture is preferably an alpha, beta-unsaturated monomer, and at least one monomer is preferably an oxirane functional monomer. More preferably, at least one of the monomers in the mixture is an oxirane group-containing alpha, beta-ethylenically unsaturated monomer.

In one embodiment, a method of preparing a food or beverage can is provided. The method includes: forming a composition that includes an emulsion polymerized latex polymer, including: forming a salt of an acid- or anhydride-functional polymer and an amine in a carrier comprising water (and an optional organic solvent) to form an aqueous dispersion; combining an ethylenically unsaturated monomer component with the aqueous dispersion; and polymerizing the ethylenically unsaturated monomer component in the presence of the aqueous dispersion to form an emulsion polymerized latex polymer; and applying the composition including the emulsion polymerized latex polymer to a metal substrate prior to or after forming the metal substrate into a food or beverage can or portion thereof. In other embodiments, the above method utilizes an aqueous dispersion that includes a polymer salt having (i) salt groups formed from salt-forming groups other than acid or anhydride groups and/or (ii) neutralizing agents other than amines.

In another embodiment, the method includes: forming a composition including an emulsion polymerized latex polymer, including: forming a salt of an acid- or anhydride-functional polymer and a tertiary amine in a carrier comprising water (and an optional organic solvent) to form an aqueous dispersion; combining an ethylenically unsaturated monomer component comprising 0.1 percent by weight (wt-%) to 30 wt-% of an oxirane-functional alpha, beta-ethylenically unsaturated monomer with the aqueous dispersion, based on the weight of the monomer component; and polymerizing the ethylenically unsaturated monomer component in the presence of the aqueous dispersion to form an emulsion polymerized latex polymer; and applying the composition comprising the emulsion polymerized latex polymer to a metal substrate prior to or after forming the metal substrate into a food or beverage can or portion thereof.

In certain embodiments, the composition can include an organic solvent in the aqueous dispersion. In certain embodiments, the method can include removing at least a portion of the organic solvent, if present, from the aqueous dispersion.

In certain embodiments, applying the composition to a metal substrate includes applying the composition to the metal substrate in the form of a planar coil or sheet, hardening the emulsion polymerized latex polymer, and forming the substrate into a food or beverage can or portions thereof. In certain embodiments, applying the composition to a metal substrate comprises applying the composition to the metal substrate after the metal substrate is formed into a can or portion thereof.

In certain embodiments, forming the substrate into a can or portion thereof includes forming the substrate into a can end or a can body. In certain embodiments, the can is a two-piece drawn food can, three-piece food can, food can end, drawn and ironed food or beverage can, beverage can end, and the like. The metal substrate can be steel or aluminum.

In certain embodiments, combining an ethylenically unsaturated monomer component with the aqueous dispersion includes adding the ethylenically unsaturated monomer component to the aqueous dispersion. The ethylenically unsaturated monomer component may be added incrementally to the aqueous dispersion, or in a batch addition.

In certain embodiments, the ethylenically unsaturated monomer component includes a mixture of monomers. Preferably, the mixture of monomers includes at least one oxirane functional group-containing monomer, and more preferably, at least one oxirane functional group-containing alpha, beta-ethylenically unsaturated monomer. In certain embodiments, the oxirane functional group-containing monomer is present in the ethylenically unsaturated monomer component in an amount of at least 0.1 wt-%, based on the weight of the monomer mixture. In certain embodiments, the oxirane functional group-containing monomer is present in the ethylenically unsaturated monomer component in an amount of no greater than 30 wt-%, based on the weight of the monomer mixture. In some embodiments, the unsaturated monomer component does not include any monomers having oxirane groups.

In certain embodiments, the methods of the present invention further include combining the emulsion polymerized latex polymer with one or more crosslinkers, fillers, catalysts, dyes, pigments, toners, extenders, lubricants, anticorrosion agents, flow control agents, thixotropic agents, dispersing agents, antioxidants, adhesion promoters, light stabilizers, organic solvents, surfactants or combinations thereof in the coating composition.

In certain embodiments, the acid-functional polymer has a number average molecular weight of 1500 to 50,000.

In certain embodiments, the composition is substantially free of mobile BPA and aromatic glycidyl ether compounds. Preferably, the composition is substantially free of bound BPA and aromatic glycidyl ether compounds.

In certain embodiments, the acid- or anhydride-functional polymer includes an acid- or anhydride-functional acrylic polymer, acid- or anhydride-functional alkyd resin, acid- or anhydride-functional polyester resin, acid- or anhydride-functional polyurethane, or combinations thereof. Preferably, the acid- or anhydride-functional polymer includes an acid-functional acrylic polymer. In other embodiments, the polymer (e.g., acrylic, alkyd, polyester, and/or polyurethane) used to form the aqueous dispersion may include any suitable combination of salt groups, salt-forming groups, or non-ionic water-dispersing groups. In some embodiments, the polymer of the aqueous dispersion may include anionic salt groups, cationic salt groups, salt-forming groups that yield an anionic or cationic salt group (e.g., when neutralized with a suitable acid or base), non-ionic water-dispersing groups, or a combination thereof. In certain embodiments, the amine is a tertiary amine. Preferably, the tertiary amine is selected from the group consisting of trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof. Preferably, the acid- or anhydride-functional polymer is at least 25% neutralized with the amine in water.

In certain embodiments, the ethylenically unsaturated monomer component is polymerized in the presence of the aqueous dispersion with a water-soluble free radical initiator at a temperature of 0° C. to 100° C. In certain embodiments, the free radical initiator includes a peroxide initiator. In certain embodiments, the free radical initiator includes hydrogen peroxide and benzoin. Alternatively, in certain embodiments the free radical initiator includes a redox initiator system.

The present invention also provides food cans and beverage cans prepared by a method described herein.

In one embodiment, the present invention provides a food or beverage can that includes: a body portion or an end portion including a metal substrate; and a coating composition disposed thereon, wherein the coating composition includes an emulsion polymerized latex polymer, wherein the emulsion polymerized latex polymer is prepared from a salt of an acid- or anhydride-functional polymer and an amine, an ethylenically unsaturated monomer component, and water. In other embodiments, the emulsion polymerized latex polymer of the food or beverage can coating includes a different polymer salt in addition to, or in place of, the salt of an acid- or anhydride-functional polymer.

In yet another embodiment, the present invention provides a composition for use in coating a food or beverage can, wherein the composition includes an emulsion polymerized latex polymer, wherein the emulsion polymerized latex polymer is prepared from a salt of an acid- or anhydride-functional polymer and an amine, an ethylenically unsaturated monomer component, and water. In other embodiments, the emulsion polymerized latex polymer of the coating composition includes a different polymer salt in addition to, or in place of, the salt of an acid- or anhydride-functional polymer.

DEFINITIONS

The term "substantially free" of a particular mobile compound means that the compositions of the present invention contain less than 1000 parts per million (ppm) of the recited mobile compound. The term "essentially free" of a particular mobile compound means that the compositions of the present invention contain less than 100 parts per million (ppm) of the recited mobile compound. The term "essentially completely free" of a particular mobile compound means that the compositions of the present invention contain less than 5 parts per million (ppm) of the recited mobile compound. The term "completely free" of a particular mobile compound means that the compositions of the present invention contain less than 20 parts per billion (ppb) of the recited mobile compound.

The term "mobile" means that the compound can be extracted from the cured coating when a coating (typically, approximate film weight of 1 mg/cm$^2$) is exposed to a test medium for some defined set of conditions, depending on the end use. An example of these testing conditions is exposure of the cured coating to 10 weight percent ethanol solution for two hours at 121° C. followed by exposure for 10 days in the solution at 49° C.

If the aforementioned phrases are used without the term "mobile" (e.g., "substantially free of XYZ compound") then the compositions of the present invention contain less than the aforementioned amount of the compound whether the compound is mobile in the coating or bound to a constituent of the coating.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups.

The term "Ar" refers to a divalent aryl group (i.e., an arylene group), which refers to a closed aromatic ring or ring system such as phenylene, naphthylene, biphenylene, fluorenylene, and indenyl, as well as heteroarylene groups (i.e., a closed ring hydrocarbon in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "heteroarylene" groups (e.g., furylene, pyridylene, etc.)

A group that may be the same or different is referred to as being "independently" something.

Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

The terms "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "a" polymer can be interpreted to mean that the coating composition includes "one or more" polymers.

Also herein, the recitations of numerical ranges by endpoints include all numbers subsumed within that range (e.g., 1 to 5 includes 1, 1.5, 2, 2.75, 3, 3.80, 4, 5, etc.).

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

This invention provides a coating composition for use on food and beverage cans that includes a latex polymer. The polymer is prepared in an emulsion polymerization process, preferably a free radical initiated polymerization process. The latex polymer can be applied to a metal substrate either before or after the substrate is formed into a food or beverage can (e.g., two-piece cans, three-piece cans) or portions thereof, whether it be a can end or can body. The latex polymers of the present invention are suitable for use in food contact situations and may be used on the inside of such cans. They are particularly useful on the interior of two-piece drawn and ironed beverage cans and on beverage can ends.

In one embodiment, the latex polymer is prepared by polymerizing an ethylenically unsaturated monomer component in an aqueous medium in the presence of the salt of an acid group- or anhydride group-containing polymer and an amine, preferably, a tertiary amine. The ethylenically unsaturated monomer component is preferably a mixture of monomers. Preferably, at least one of the monomers in the mixture is an alpha, beta-ethylenically unsaturated monomer, and preferably at least one of the monomers contains an oxirane groups. More preferably, at least one of the monomers is an oxirane group-containing alpha, beta-ethylenically unsaturated monomer.

In another embodiment, the latex polymer is prepared by polymerizing the ethylenically unsaturated monomer component in the presence of an aqueous dispersion of a polymer, such as for example, a water-dispersible polyester resin, alkyd resin, polyurethane resin, or a combination thereof. The polymer of the aqueous dispersion can be made water-dispersible by incorporating non-ionic water-dispersing groups, salt groups (e.g., anionic and/or cationic salt groups), or a combination thereof. As used herein, the term "water-dispersing groups" also encompasses water-solubilizing groups.

The composition may optionally include crosslinkers, fillers, catalysts, dyes, pigments, toners, extenders, lubricants, anticorrosion agents, flow control agents, thixotropic agents, dispersing agents, antioxidants, adhesion promoters, light stabilizers, surfactants, organic solvents, and mixtures thereof as required to provide the desired film properties.

In one embodiment, the coating composition is prepared by: forming a salt of an acid-functional or anhydride-functional polymer and an amine; dispersing the salt in a carrier that includes water and an optional organic solvent to form an aqueous dispersion; optionally removing the organic solvent, if present, from the aqueous dispersion; combining an ethylenically unsaturated monomer component with the aqueous dispersion (preferably, the ethylenically unsaturated monomer component is added to the aqueous dispersion); and polymerizing the ethylenically unsaturated monomer component in the presence of the aqueous dispersion to form an emulsion polymerized latex polymer. In some embodiments, a neutralizing base other than an amine may be used to form the salt of the acid-functional or anhydride-functional polymer. Moreover, in other embodiments, a polymer salt including salt groups other than neutralized acid or anhydride groups may be used.

Preferred compositions are substantially free of mobile bisphenol A (BPA) and aromatic glycidyl ether compounds (e.g., BADGE, BFDGE, and epoxy novalacs), more preferably essentially free of these compounds, even more preferably essentially completely free of these compounds, and most preferably completely free of these compounds. The coating composition is also preferably substantially free of bound BPA and aromatic glycidyl ether compounds, more preferably essentially free of these compounds, most preferably essentially completely free of these compounds, and optimally completely free of these compounds.

Preferred emulsion polymerized latex polymers are at least substantially "epoxy-free", more preferably "epoxy-free." The term "epoxy-free", when used herein in the context of a polymer, refers to a polymer that does not include any epoxy backbone segments. Thus, for example, a polymer made from ingredients including an epoxy resin would not be considered epoxy-free. Similarly, a polymer having backbone segments that are the reaction product of a bisphenol (e.g., bisphenol A, bisphenol F, bisphenol S, 4,4'dihydroxy bisphenol, etc.) and a halohdyrin (e.g., epichlorohydrin) would not be considered epoxy-free. The coating composition is also preferably at least substantially epoxy-free, more preferably epoxy-free.

The ethylenically unsaturated monomer component is preferably a mixture of monomers that is capable of free radical initiated polymerization in aqueous medium. The monomer mixture preferably contains at least one oxirane functional monomer, and more preferably, at least one oxirane group-containing alpha, beta-ethylenically unsaturated monomer.

The monomer mixture preferably contains at least 0.1 wt-%, more preferably at least 1 wt-%, of an oxirane group-containing monomer, based on the weight of the monomer mixture. Typically, at least 0.1 wt-% of the oxirane group-containing monomer contributes to the stability of the latex. Although not intended to be limited by theory, it is believed that this is because of the reduction in the amount of quaternary salt formation between the oxirane species, acid group-containing polymer, and amine, which can cause coagulation of the latex. In addition, at least 0.1 wt-% of the oxirane group-containing monomer contributes to crosslinking in the dispersed particles and during cure, resulting in better properties of coating compositions formulated with the polymeric latices.

The monomer mixture preferably contains no greater than 30 wt-%, more preferably no greater than 20 wt-%, even more preferably no greater than 10 wt-%, and optimally no greater than 9 wt-%, of the oxirane group-containing monomer, based on the weight of the monomer mixture. Typically, greater than 30 wt-% of the oxirane group-containing monomer in the monomer mixture can contribute to diminished film properties. Although not intended to be limited by theory, it is believed that this is due to embrittlement caused by an overabundance of crosslinking.

In some embodiments, the monomer mixture does not contain any oxirane-group containing monomer.

Suitable oxirane-functional monomers include monomers having a reactive carbon-carbon double bond and an oxirane (i.e., a glycidyl) group. Typically, the monomer is a glycidyl ester of an alpha, beta-unsaturated acid, or anhydride thereof (i.e., an oxirane group-containing alpha, beta-ethylenically unsaturated monomer). Suitable alpha, beta-unsaturated acids include monocarboxylic acids or dicarboxylic acids. Examples of such carboxylic acids include, but are not limited to, acrylic acid, methacrylic acid, alpha-chloroacrylic acid, alpha-cyanoacrylic acid, beta-methylacrylic acid (crotonic acid), alpha-phenylacrylic acid, beta-acryloxypropionic acid, sorbic acid, alpha-chlorosorbic acid, angelic acid, cinnamic acid, p-chlorocinnamic acid, beta-stearylacrylic acid, itaconic acid, citraconic acid, mesaconic acid, glutaconic acid, aconitic acid, maleic acid, fumaric acid, tricarboxyethylene, maleic anhydride, and mixtures thereof.

Specific examples of suitable monomers containing a glycidyl group are glycidyl(meth)acrylate (i.e., glycidyl methacrylate and glycidyl acrylate), mono- and di-glycidyl itaconate, mono- and di-glycidyl maleate, and mono- and di-glycidyl formate. It also is envisioned that allyl glycidyl ether and vinyl glycidyl ether can be used as the oxirane-functional monomer. A preferred monomer is glycidyl methacrylate ("GMA").

The oxirane-functional monomer is preferably reacted with suitable other monomers within the monomer mixture. These can be ethylenically unsaturated monomer and hydroxy-functional monomers. Suitable ethylenically unsaturated monomers include alkyl(meth)acrylates, vinyl monomers, alkyl esters of maleic or fumaric acid, and the like.

Suitable alkyl(meth)acrylates include those having the structure: $CH_2=C(R^1)-CO-OR^2$ wherein $R^1$ is hydrogen or methyl, and $R^2$ is an alkyl group preferably containing one to sixteen carbon atoms. The $R^2$ group can be substituted with one or more, and typically one to three, moieties such as hydroxy, halo, phenyl, and alkoxy, for example. Suitable alkyl(meth)acrylates therefore encompass hydroxy alkyl (meth)acrylates. The alkyl(meth)acrylate typically is an ester of acrylic or methacrylic acid. Preferably, $R^1$ is hydrogen or methyl and $R^2$ is an alkyl group having two to eight carbon atoms. Most preferably, $R^1$ is hydrogen or methyl and $R^2$ is an alkyl group having two to four carbon atoms.

Examples of suitable alkyl(meth)acrylates include, but are not limited to, methyl(meth)acrylate, ethyl(meth)acrylate, propyl(meth)acrylate, isopropyl(meth)acrylate, butyl(meth)acrylate, isobutyl(meth)acrylate, pentyl(meth)acrylate, isoamyl(meth)acrylate, hexyl(meth)acrylate, 2-ethylhexyl (meth)acrylate, cyclohexyl(meth)acrylate, decyl(meth)acrylate, isodecyl(meth)acrylate, benzyl(meth)acrylate, lauryl (meth)acrylate, isobornyl(meth)acrylate, octyl(meth) acrylate, nonyl(meth)acrylate, hydroxyethyl acrylate (HEA), hydroxyethyl methacrylate (HEMA), hydroxypropyl(meth) acrylate (HPMA).

Difunctional(meth)acrylate monomers may be used in the monomer mixture as well. Examples include ethylene glycol di(meth)acrylate, 1,6-hexanediol di(meth)acrylate, allyl methacrylate, and the like.

Suitable vinyl monomers include styrene, methyl styrene, halostyrene, isoprene, diallylphthalate, divinylbenzene, conjugated butadiene, alpha-methylstyrene, vinyl toluene, vinyl naphthalene, and mixtures thereof. The vinyl aromatic monomers described below in connection with the acid- or anhydride-functional polymer are also suitable for use in the ethylenically unsaturated monomer component used to make the latex polymer. Styrene is a presently preferred vinyl monomer, in part due to its relatively low cost.

Other suitable polymerizable vinyl monomers for use in the ethylenically unsaturated monomer component include acrylonitrile, acrylamide, methacrylamide, methacrylonitrile, vinyl acetate, vinyl propionate, vinyl butyrate, vinyl stearate, N-isobutoxymethyl acrylamide, N-butoxymethyl acrylamide, and the like.

When present, the oxirane group-containing monomer preferably constitutes 0.1 wt-% to 30 wt-%, and more preferably 1 wt-% to 20 wt-%, of the ethylenically unsaturated monomer component. The other monomer or monomers in the mixture constitute the remainder of the monomer component, that is, 70 wt-% to 99.9 wt-%, preferably 80 wt-% to 99 wt-%, based on total weight of the monomer mixture.

Preferably, at least 40 wt-% of the ethylenically unsaturated monomer component, more preferably at least 50 wt-%, will be selected from alkyl acrylates and methacrylates. Preferably, at least 20 wt-%, more preferably at least 30 wt-%, will be selected from vinyl aromatic compounds.

Preferably, at least 5 wt-%, more preferably at least 25 wt-%, even more preferably at least 50 wt-%, and even more preferably at least 60 wt-%, of the ethylenically unsaturated monomer component is used in making the latex polymer. Preferably, no greater than 95 wt-%, more preferably no greater than 90 wt-%, and even more preferably no greater than 85 wt-%, of the ethylenically unsaturated monomer component is used in making the latex polymer. Such percentages are based on total weight of ethylenically unsaturated monomer component and salt of the acid group-containing or anhydride group-containing polymer (i.e., acid-functional or anhydride-functional polymer)). In embodiments where other water-dispersible polymers are used in place of or in addition to the acid group-containing or anhydride group-containing polymer, such percentages are based on total weight of ethylenically unsaturated monomer component and water-dispersible polymers.

Among the acid functional polymers that can be employed in preparing the latex polymer of the present invention are virtually any acid-containing or anhydride-containing polymers that can be neutralized or partially neutralized with an appropriate amine or other suitable base to form a salt that can be dissolved or stably dispersed in the aqueous medium. The choice of the acid-containing or anhydride-containing monomer(s) is dictated by the intended end use of the coating composition and is practically unlimited.

The acid-containing polymer (i.e., acid-functional polymer) preferably has an acid number of at least 40, and more preferably at least 100, milligrams (mg) KOH per gram resin. The acid-containing polymer preferably has an acid number of no greater than 400, and more preferably no greater than 300, mg KOH per gram resin. The anhydride-containing polymer, when in water, preferably has similar acid number ranges.

Low molecular weight polymers are preferred for certain applications of the present invention. Preferably, the molecular weight of the acid- or anhydride-functional polymer is no greater than 50,000 on a number average molecular weight basis, and preferably no greater than 20,000. Preferably, the molecular weight of the acid- or anhydride-functional polymer is at least 1500 on a number average molecular weight basis, and more preferably at least 2000. When salt-forming groups other than acid- or anhydride-groups are used, the molecular weight of the polymer salt will typically fall within the above parameters.

Preferred acid- or anhydride-functional polymers that may be employed include acid-functional or anhydride-functional acrylic polymers, alkyd resins, polyester polymers, and polyurethanes. Combinations of such polymers can be used if desired. Herein, the term polymer includes both homopolymers and copolymers (i.e., polymers of two or more different monomers).

Preferred acid- or anhydride-functional polymers utilized in this invention include those prepared by conventional free radical polymerization techniques. Suitable examples include those prepared from unsaturated acid- or anhydride-functional monomers, or salts thereof, and other unsaturated monomers. Of these, preferred examples include those prepared from at least 15 wt-%, more preferably at least 20 wt-%, unsaturated acid- or anhydride-functional monomer, or salts thereof, and the balance other polymerizable unsaturated monomer. Examples of co-monomers described previously apply here as well.

A variety of acid- or anhydride-functional monomers, or salts thereof, can be used; their selection is dependent on the desired final polymer properties. Preferably, such monomers are ethylenically unsaturated, more preferably, alpha, beta-ethylenically unsaturated. Suitable ethylenically unsaturated acid- or anhydride-functional monomers for the present invention include monomers having a reactive carbon-carbon double bond and an acidic or anhydride group, or salts thereof. Preferred such monomers have from 3 to 20 carbons, at least 1 site of unsaturation, and at least 1 acid or anhydride group, or salt thereof.

Suitable acid-functional monomers include ethylenically unsaturated acids (mono-protic or diprotic), anhydrides or monoesters of a dibasic acid, which are copolymerizable with the optional other monomer(s) used to prepare the polymer. Illustrative monobasic acids are those represented by the structure $CH_2=C(R^3)-COOH$, where $R^3$ is hydrogen or an alkyl radical of 1 to 6 carbon atoms. Suitable dibasic acids are those represented by the formulas $R^4(COOH)C=C(COOH)R^5$ and $R^4(R^5)C=C(COOH)R^6COOH$, where $R^4$ and $R^5$ are hydrogen, an alkyl radical of 1-8 carbon atoms, halogen, cycloalkyl of 3 to 7 carbon atoms or phenyl, and $R^6$ is an alkylene radical of 1 to 6 carbon atoms. Half-esters of these acids with alkanols of 1 to 8 carbon atoms are also suitable.

Non-limiting examples of useful ethylenically unsaturated acid-functional monomers include acids such as, for example, acrylic acid, methacrylic acid, alpha-chloroacrylic acid, alpha-cyanoacrylic acid, crotonic acid, alpha-phenylacrylic acid, beta-acryloxypropionic acid, fumaric acid, maleic acid, sorbic acid, alpha-chlorosorbic acid, angelic acid, cinnamic acid, p-chlorocinnamic acid, beta-stearylacrylic acid, citraconic acid, mesaconic acid, glutaconic acid, aconitic acid, tricarboxyethylene, 2-methyl maleic acid, itaconic acid, 2-methyl itaconic acid, methyleneglutaric acid, and the like, or mixtures thereof. Preferred unsaturated acid-functional monomers include acrylic acid, methacrylic acid, crotonic acid, fumaric acid, maleic acid, 2-methyl maleic acid, itaconic acid, 2-methyl itaconic acid, and mixtures thereof. More preferred unsaturated acid-functional monomers include acrylic acid, methacrylic acid, crotonic acid, fumaric acid, maleic acid, itaconic acid, and mixtures thereof. Most preferred unsaturated acid-functional monomers include acrylic acid, methacrylic acid, maleic acid, crotonic acid, and mixtures thereof.

Nonlimiting examples of suitable ethylenically unsaturated anhydride monomers include compounds derived from the above acids (e.g., as pure anhydride or mixtures of such). Preferred anhydrides include acrylic anhydride, methacrylic anhydride, and maleic anhydride. If desired, aqueous salts of the above acids may also be employed.

Polymerization of the monomers to form an acid- or anhydride-functional polymer is usually conducted by organic solution polymerization techniques in the presence of a free radical initiator as is well known in the art. Although the preparation of the acid-functional or anhydride-functional polymer is conveniently carried out in solution, neat processes may be used if desired.

Besides the acid- or anhydride-functional acrylic polymers, acid- or anhydride-functional alkyd, polyester, polyurethane resins, or combinations thereof, can also be used in the practice of the invention. Such polymers are described in U.S. Pat. Nos. 4,692,491; 3,479,310; and 4,147,679. Preferably, the acid- or anhydride-functional polymers are acid-functional acrylic polymers.

In another preferred embodiment, the acid- or anhydride-functional polymers are polyester polymers. Examples of such polyester polymers are disclosed in U.S. Provisional Patent Application Ser. No. 60/727,734, filed on, Oct. 18, 2005 entitled COATING COMPOSITIONS FOR CONTAINERS AND METHODS OF COATING, subsequently filed as U.S. Non-Provisional patent application Ser. No. 11/550,451. Briefly, the polymers described therein have one or more segments of Formula I:

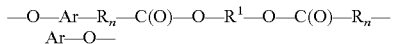

wherein each Ar is independently a divalent aryl group (i.e., an arylene group) or heteroarylene group; $R^1$ is a divalent organic group; each R is independently a divalent organic group; and n is 0 or 1. Any one polymer can have a variety of such segments, which may be the same or different.

Preferably, $R^1$ provides hydrolytic stability to at least one of the adjacent ester linkages (—C(O)—O— and —O—C(O)—), and preferably to both of them. In this context, "hydrolytic stability" means that $R^1$ decreases the reactivity (preferably, by at least half) of the adjacent ester linkage with water compared to a —$CH_2$—$CH_2$— moiety under the same conditions. This can be accomplished by selection of $R^1$ that includes a sterically bulky group in proximity (preferably within two atoms distance) to the oxygen of the ester. The polymer preferably includes more than 70%, more preferably more than 80%, and even more preferably more than 90%, hydrolytically stable ester linkages (based on the total number of ester linkages).

In the segments of Formula I, $R^1$ is a divalent organic group, preferably, having at least 3 carbon atoms, more preferably, at least 4 carbon atoms, even more preferably, at least 5 carbon atoms, and even more preferably, at least 8 carbon atoms. It is envisioned that $R^1$ can be as large as desired for the particular application, which one of skill in the art can readily determine.

In certain preferred embodiments of Formula I, $R^1$ is of the formula

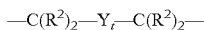

wherein each $R^2$ is independently hydrogen or an organic group (e.g., an alicyclic group or a branched or unbranched alkyl group), Y is a divalent organic group, and t is 0 or 1 (preferably 1). In certain embodiments, each $R^2$ is independently hydrogen.

In certain embodiments, Y can optionally include one or more ether or ester linkages. In certain embodiments, Y is a divalent saturated aliphatic group (i.e., a branched or unbranched alkylene group), a divalent alicyclic group, or a divalent aromatic group (i.e., an arylene group), or combinations thereof.

In certain embodiments, Y is a divalent alkyl group (i.e., an alkylene group), which can be branched or unbranched, preferably having at least 1 carbon atom, more preferably having at least 2 carbon atoms, even more preferably having at least 3 carbon atoms, and even more preferably having at least 6 carbon atoms. In certain embodiments, Y is a divalent alicyclic group, preferably cyclohexylene. It is envisioned that Y can be as large as desired for the particular application, which one of skill in the art can readily determine.

Preferably, Y provides hydrolytic stability to at least one of the ester linkages adjacent $R^1$ in Formula I. This can be accomplished by selection of Y that includes a sterically bulky group that is in proximity (preferably within two atoms) of at least one of the ester oxygen atoms in Formula I.

In certain embodiments, $R^1$ has the formula —$(C(R^2)_2)_s$— wherein s is at least 2, and preferably, s is at least 3, wherein each $R^2$ is as defined above. Examples of such $R^1$ groups include, for example, neopentylene, butylethylpropylene, and —$CH_2$—$CH(CH_3)$—$CH_2$—.

In certain embodiments, Y has the formula

—[$Z_w$—$C(R^2)_2$—O—C(O)—$R^3$—C(O)—O— $C(R^2)_2$—]$_v Z_w$—, wherein w is 0 or 1, v is 1 to 10, each $R^2$ is as defined above, each $R^3$ is independently a divalent organic group, and each Z is independently a divalent organic group.

In certain embodiments, $R^3$ is a divalent saturated aliphatic group (i.e., branched or unbranched alkylene group), a divalent alicyclic group, an arylene group, or combinations thereof. In certain embodiments, $R^3$ is a (C3-C20)alkylene (branched or unbranched) group or a phenylene group.

In certain embodiments, Z is a divalent saturated aliphatic group (i.e., branched or unbranched alkylene group), a divalent alicyclic group, a divalent aromatic group (i.e., an arylene group), or combinations thereof.

Preferably, Z provides hydrolytic stability to at least one of the ester linkages adjacent $R^1$ in Formula I and/or to an adjacent ester linkage contained within Y. This can be accomplished by selection of Z that includes a sterically bulky group that is in proximity (preferably within two atoms distance) of at least one of the ester oxygen atoms.

In the segments of Formula I, n is preferably 0 (i.e., R is not present). If n is 1 and R is present, however, it is preferably a (C1-C4)alkylene group, and more preferably a (C1-C4)alkylene moiety.

In the segments of Formula I, preferably each Ar has less than 20 carbon atoms, more preferably less than 11 carbon atoms, and even more preferably less than 8 carbon atoms. Preferably, Ar has at least 4 carbon atoms, more preferably at least 5 carbon atoms, and even more preferably, at least 6 carbon atoms.

In certain embodiments, each Ar is a phenylene group. In certain embodiments, each Ar is a phenylene group of the formula —$C_6(R^4)_4$—, wherein each $R^4$ is independently hydrogen, a halogen, or an organic group, and wherein two $R^4$ groups can join to form a ring optionally containing one or more heteroatoms. In certain embodiments, $R^4$ is hydrogen or an organic group, wherein two $R^4$ groups can join to form a 6-membered ring. Preferably, $R^4$ is hydrogen.

Polyester polymers such as these can be made by a variety of methods from compounds of Formula II:

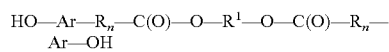

wherein Ar, R, $R^1$, and n are as defined above. Such compounds can be made, for example, by the esterification reaction of one mole of a diol (e.g., HO—$R^1$—OH such as, for example, 1,4-cyclohexane dimethanol, neopentyl glycol, 2-butyl-2-ethyl-1,3-propane diol, or 2-methyl-1,3-propane diol) with two moles of an acid (e.g., 4-hydroxy benzoic acid). Alternatively, such compounds can be made, for example, by the transesterification reaction of one mole of a diol (e.g., 1,4-cyclohexane dimethanol, neopentyl glycol, 2-butyl-2-ethyl-1,3-propane diol, or 2-methyl-1,3-propane diol) with two moles of an ester (e.g., 4-hydroxy methyl benzoate, 4-hydroxy ethyl benzoate, or 4-hydroxy butyl benzoate).

Polymers of Formula I can be prepared by methods that involve advancing the molecular weight of compounds of Formula II. In certain embodiments, compounds of Formula II (e.g., dihydric phenols) can be reacted with a diepoxide to advance the molecular weight. For example, compounds of Formula II (e.g., dihydric phenols) can be reacted with non-BPA and non-BPF based diepoxides much in the same manner that Bisphenol A or Bisphenol F do, to create polymers that can be formulated with crosslinkers and additives for coatings for rigid packaging. For example, compounds of Formula II can be reacted with a diepoxide to form a polymer that includes —CH$_2$—CH(OH)—CH$_2$— segments. Alternatively, compounds of Formula II can be reacted with epichlorohydrin to form a diepoxide analog of compounds of Formula II, which can then be reacted with other compounds of Formula II to form a polymer that includes —CH$_2$—CH(OH)—CH$_2$— segments.

The diepoxide analogs of compounds of Formula II (e.g., glycidyl polyethers of the dihydric phenols) can be prepared by reacting the required proportions of a compound of Formula II (e.g., dihydric phenol) and epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures of 50° C. to 150° C. The heating is continued for several hours to effect the reaction and the product is then washed free of salt and base. Procedures for such reactions are generally well known and disclosed, for example, in U.S. Pat. No. 2,633,458.

As used in the present invention, suitable diepoxides (other than the diepoxide analogs of compounds of Formula II) are BPA- or BPF-free diepoxides, preferably with one or more ether linkages. Suitable diepoxides may be prepared by a variety of processes, for example, by the condensation of a dihydroxy compound and epichlorohydrin. Examples of suitable diepoxides (other than the diepoxide analogs of compounds of Formula II) include, for example, 1,4-cyclohexanedimethanol diglycidyl ether (CHDMDGE), resorcinol diglycidyl ether, neopentyl glycol diglycidyl ether, and 2-methyl-1,3-propandiol diglycidyl ether.

The resultant polymers of Formula I may be epoxy terminated or phenoxy terminated, for example. They may be made in a variety of molecular weights, such as the molecular weights of commercially available BPA-based epoxy materials (e.g., those available under trade designations such as EPON 828, 1001, 1007, 1009 from Resolution Performance Products, Houston, Tex.). Preferred polymers of the present invention have a number average molecular weight (Mn) of at least 2,000, more preferably at least 3,000, and even more preferably at least 4,000. The molecular weight of the polymer may be as high as is needed for the desired application.

Advancement of the molecular weight of the polymer may be enhanced by the use of a catalyst in the reaction of a diepoxide (whether it be a diepoxide analog of Formula II or another diepoxide) with a compound of Formula (II). Typical catalysts usable in the advancement of the molecular weight of the epoxy material of the present invention include amines, hydroxides (e.g., potassium hydroxide), phosphonium salts, and the like. A presently preferred catalyst is a phosphonium catalyst. The phosphonium catalyst useful in the present invention is preferably present in an amount sufficient to facilitate the desired condensation reaction.

Alternatively, the epoxy terminated polymers of Formula I may be reacted with fatty acids to form polymers having unsaturated (e.g., air oxidizable) reactive groups, or with acrylic acid or methacrylic acid to form free radically curable polymers.

Advancement of the molecular weight of the polymer may also be enhanced by the reaction of an epoxy terminated polymer of Formula I with a suitable diacid (such as adipic acid).

A salt (which can be a full salt or partial salt) of the acid- or anhydride-functional polymer is formed by neutralizing or partially neutralizing the acid groups (whether present initially in the acid-functional polymer or formed upon addition of the anhydride-functional polymer to water) of the polymer with a suitable base such as, for example, an amine, preferably a tertiary amine Some examples of suitable tertiary amines are trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof. Most preferably triethyl amine or dimethyl ethanol amine is used as the tertiary amine.

The degree of neutralization required to form the desired polymer salt may vary considerably depending upon the amount of acid included in the polymer, and the degree of solubility or dispersibility of the salt which is desired. Ordinarily in making the polymer water-dispersible, the acidity of the polymer is at least 25% neutralized, preferably at least 30% neutralized, and more preferably at least 35% neutralized, with the amine in water. When using anionic salt-forming groups other than acid or anhydride groups or cationic salt-forming groups, the degree of neutralization may be pursuant to those described above. Preferably, the polymer of the aqueous dispersion includes a sufficient number of water-dispersing groups to form a stable aqueous dispersion.

As previously discussed, any suitable salt-forming or water-dispersing group may be used in place of, or in addition to, acid or anhydride groups. For further discussion of such groups, see, for example, U.S. Pat. No. 4,147,679. Some further examples of anionic salt groups include sulphate groups (—OSO$_3^-$), phosphate groups (—OPO$_3^-$), sulfonate groups (—SO$_2$O$^-$), phosphinate groups (—POO$^-$), phosphonate groups (—PO$_3^-$), and combinations thereof. Some examples of suitable cationic salt groups include:

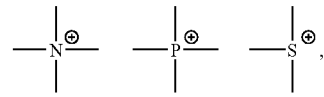

(referred to, respectively, as quaternary ammonium groups, quaternary phosphonium groups, and tertiary sulfate groups) and combinations thereof. Some examples of non-ionic water-dispersing groups include hydrophilic groups such as ethylene oxide groups. Compounds for introducing the aforementioned groups into polymers are known in the art. Some additional examples of neutralizing bases for forming anionic salt groups include inorganic and organic bases such as sodium hydroxide, potassium hydroxide, lithium hydroxide, ammonium hydroxide, and mixtures thereof. Some examples of neutralizing compounds for forming cationic salt groups include organic and inorganic acids such as formic acid, acetic acid, hydrochloric acid, sulfuric acid, and combinations thereof.

The amount of the salt of the acid-functional or anhydride-functional polymer that is used in the polymerization is preferably at least 5 wt-%, more preferably at least 10 wt-%, and even more preferably at least 15 wt-%. The amount of the salt of the acid-functional or anhydride-functional polymer that is used in the polymerization is preferably no greater than 95 wt-%, preferably no greater than 50 wt-%, and even more preferably no greater than 40 wt-%. These percentages are based on total weight of polymerizable ethylenically unsaturated monomer component and the salt of the acid group-containing polymer. In embodiments where the polymer includes water-dispersing groups other than neutralized acid- or anhydride-groups, the total amount of the polymer used in the polymerization will typically fall within the above parameters, with the above percentages based on based on total weight of ethylenically unsaturated monomer component and water-dispersible polymers The reaction of tertiary amines with materials containing oxirane groups, when carried out in the presence of water, can afford a product that contains both a hydroxyl group and a quaternary ammonium hydroxide. Under preferred conditions an acid group, an oxirane group, and an amine form a quaternary salt. This linkage is favored, as it not only links the polymers but promotes water dispersibility of the joined polymer. It should be noted that an acid group and an oxirane group may also form an ester. Some of this reaction is possible, though this linkage is less desirable when water dispersibility is sought.

While the exact mode of reaction is not fully understood, it is believed that a competition between the two reactions exist; however, this is not intended to be limiting. In preferred embodiments, one reaction involves the tertiary amine neutralized acid-functional polymer reacting with an oxirane-functional monomer or polymer to form a quaternary ammonium salt. A second reaction involves esterification of the oxirane-functional monomer or polymer with a carboxylic acid or salt. In the current invention it is believed the presence of water and level of amine favor formation of quaternary ammonium salts over ester linkages. A high level of quaternization improves water dispersability while a high level of esterification gives higher viscosity and possibly gel-like material.

With regard to the conditions of the emulsion polymerization, the ethylenically unsaturated monomer component is preferably polymerized in aqueous medium with a water-soluble free radical initiator in the presence of the salt of the acid- or anhydride-functional polymer.

The temperature of polymerization is typically from 0° C. to 100° C., preferably from 50° C. to 90° C., more preferably from 70° C. to 90° C., and even more preferably from 80° C. to 85° C. The pH of the aqueous medium is usually maintained at a pH of 5 to 12.

The free radical initiator can be selected from one or more water-soluble peroxides which are known to act as free radical initiators. Examples include hydrogen peroxide and t-butyl hydroperoxide. Redox initiator systems well known in the art (e.g., t-butyl hydroperoxide, erythorbic acid, and ferrous complexes) can also be employed. In some embodiments, it is especially preferred to use a mixture of benzoin and hydrogen peroxide. Persulfate initiators such as ammonium persulfate or potassium persulfate are not preferred, as they lead to poor water resistance properties of the cured coating.

Further examples of polymerization initiators which can be employed include polymerization initiators which thermally decompose at the polymerization temperature to generate free radicals. Examples include both water-soluble and water-insoluble species. Further examples of free radical initiators that can be used include persulfates, such as ammonium or alkali metal (potassium, sodium or lithium) persulfate; azo compounds such as 2,2'-azo-bis(isobutyronitrile), 2,2'-azo-bis(2,4-dimethylvaleronitrile), and 1-t-butyl-azocyanocyclohexane; hydroperoxides such as t-butyl hydroperoxide, hydrogen peroxide, t-amyl hydroperoxide, methyl hydroperoxide, and cumene hydroperoxide; peroxides such as benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, and t-butylperoxy pivilate; peresters such as t-butyl peracetate, t-butyl perphthalate, and t-butyl perbenzoate; as well as percarbonates, such as di(1-cyano-1-methylethyl)peroxy dicarbonate; perphosphates, and the like; and combinations thereof.

Polymerization initiators can be used alone or as the oxidizing component of a redox system, which also preferably includes a reducing component such as ascorbic acid, malic acid, glycolic acid, oxalic acid, lactic acid, thiogycolic acid, or an alkali metal sulfite, more specifically a hydrosulfite, hyposulfite or metabisulfite, such as sodium hydrosulfite, potassium hyposulfite and potassium metabisulfite, or sodium formaldehyde sulfoxylate, and combinations thereof. The reducing component is frequently referred to as an accelerator or a catalyst activator.

The initiator and accelerator is preferably used in proportion from about 0.001% to 5% each, based on the weight of monomers to be copolymerized. Promoters such as chloride and sulfate salts of cobalt, iron, nickel or copper can be used in small amounts, if desired. Examples of redox catalyst systems include tert-butyl hydroperoxide/sodium formaldehyde sulfoxylate/Fe(II), and ammonium persulfate/sodium bisulfate/sodium hydrosulfite/Fe(II).

Chain transfer agents can be used to control polymer molecular weight, if desired.

The polymerization reaction of the ethylenically unsaturated monomer component in the presence of the aqueous dispersion of the polymer salt may be conducted as a batch, intermittent, or continuous operation. While all of the polymerization ingredients may be charged initially to the polymerization vessel, better results normally are obtained with proportioning techniques. In certain embodiments, however, it is desirable to charge all, or substantially all, of the ingredients to the polymerization vessel before commencing polymerization.

Typically, the reactor is charged with an appropriate amount of water, polymer salt, and free radical initiator. The reactor is then heated to the free radical initiation temperature and then charged with the ethylenically unsaturated monomer component. Preferably only water, initiator, polymer salt, and some portion of the ethylenically unsaturated monomer component are initially charged to the vessel. There may also be some water miscible solvent present. After this initial charge is allowed to react for a period of time at polymerization temperature, the remaining ethylenically unsaturated monomer component is added incrementally with the rate of addition being varied depending on the polymerization temperature, the particular initiator being employed, and the type and amount of monomers being polymerized. After all the monomer component has been charged, a final heating is carried out to complete the polymerization. The reactor is then cooled and the latex recovered.

As discussed above, in certain embodiments a "batch" process may be used to polymerize the ethylenically unsaturated monomer component in the presence of the aqueous dispersion. While not intending to be bound by any theory, batch polymerization of the ethylenically unsaturated monomer component can result in a higher molecular weight polymerized component that may yield desirable performance properties for certain coating end uses such as, for example, beverage end coatings. In certain preferred embodiments, the polymerized ethylenically unsaturated monomer component has a Mn of at least about 100,000, more preferably at least about 200,000, or even more preferably at least about 300,000. The upper range of the Mn of the polymerized ethylenically unsaturated monomer component is not restricted and may be 1,000,000 or more. In certain embodiments, however, the Mn of the polymerized ethylenically unsaturated component is less than about 1,000,000, or less than about 600,000.

Redox initiation is presently preferred for use in batch polymerizing the ethylenically unsaturated component.

It is contemplated that the benefits of a batch polymerization process may also be realized by (i) batch polymerizing, for example, a substantial portion (e.g., at least a majority) of the ethylencially unsaturated monomer component and then later (ii) adding the balance of the ethylenically unsaturated monomer component (e.g., through a continuous or intermittent feed) and completing the polymerization. Thus, for example, in certain embodiments, at least about 75 wt-%, more preferably at least about 85 wt-%, and even more preferably at least about 95 wt-% of the total amount of ethylenically unsaturated monomer component is present as unreacted monomer in the aqueous dispersion within a 1-hour time period (more preferably within a 30-minute time period) during polymerization of the ethylenically unsaturated monomer component, and more preferably at the same time (e.g., at the onset of polymerization of the ethylenically unsaturated monomer component).

In some embodiments (e.g., where batch polymerization is used), the polymerized ethylenically unsaturated monomer component constitutes at least about 75 wt-% of the emulsion polymerized latex polymer, more preferably at least about 85 wt-%, and even more preferably at least about 95 wt-%.

In some embodiments (e.g., where batch polymerization is used), the emulsion polymerized latex polymer exhibits a Mn of at least about 100,000, more preferably at least about 200,000, and even more preferably at least about 300,000.

Coating compositions of the invention preferably include at least a film-forming amount of the latex polymer. In preferred embodiments, the coating composition includes at least about 5 wt-%, more preferably at least about 15 wt-%, and even more preferably at least about 25 wt-% of the latex polymer, based on the weight of the latex polymer solids relative to the total weight of the coating composition. Preferably, the coating composition includes less than about 65 wt-%, more preferably less than about 55 wt-%, and even more preferably less than about 45 wt-% of the latex polymer, based on the weight of the latex polymer solids relative to the total weight of the coating composition.

It has been discovered that coating compositions using the aforementioned latices may be formulated using one or more optional curing agents (i.e., crosslinking resins, sometimes referred to as "crosslinkers"). The choice of particular crosslinker typically depends on the particular product being formulated. For example, some coating compositions are highly colored (e.g., gold-colored coatings). These coatings may typically be formulated using crosslinkers that themselves tend to have a yellowish color. In contrast, white coatings are generally formulated using non-yellowing crosslinkers, or only a small amount of a yellowing crosslinker. Preferred curing agents are substantially free of mobile BPA and aromatic glycidyl ether compounds (e.g., BADGE, BFDGE and epoxy novalacs).

Any of the well known hydroxyl-reactive curing resins can be used. For example, phenoplast, and aminoplast curing agents may be used.

Phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol.

Aminoplast resins are the condensation products of aldehydes such as formaldehyde, acetaldehyde, crotonaldehyde, and benzaldehyde with amino or amido group-containing substances such as urea, melamine, and benzoguanamine.

Examples of suitable crosslinking resins include, without limitation, benzoguanamine-formaldehyde resins, melamine-formaldehyde resins, esterified melamine-formaldehyde, and urea-formaldehyde resins. Preferably, the crosslinker employed when practicing this invention includes a melamine-formaldehyde resin. One specific example of a particularly useful crosslinker is the fully alkylated melamine-formaldehyde resin commercially available from Cytec Industries, Inc. under the trade name of CYMEL 303.

As examples of other generally suitable curing agents are the blocked or non-blocked aliphatic, cycloaliphatic or aromatic di-, tri-, or poly-valent isocyanates, such as hexamethylene diisocyanate (HMDI), cyclohexyl-1,4-diisocyanate, and the like. Further examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates are used that have a Mn of at least about 300, more preferably at least about 650, and even more preferably at least about 1,000.

Polymeric blocked isocyanates are preferred in certain embodiments. Some examples of suitable polymeric blocked isocyanates include a biuret or isocyanurate of a diisocyanate, a trifunctional "trimer", or a mixture thereof. Examples of suitable blocked polymeric isocyanates include Trixene BI 7951, Trixene BI 7984, Trixene BI 7963, Trixene BI 7981 (Trixene materials are available from Baxenden Chemicals, Ltd., Accrington, Lancashire, England), Desmodur BL 3175A, Desmodur BL3272, Desmodur BL3370, Desmodur BL 3475, Desmodur BL 4265, Desmodur PL 340, Desmodur VP LS 2078, Desmodur VP LS 2117, and Desmodur VP LS 2352 (Desmodur materials are available from Bayer Corp., Pittsburgh, Pa., USA), or combinations thereof. Examples of suitable trimers may include a trimerization product prepared from on average three diisocyanate molecules or a trimer prepared from on average three moles of diisocyanate (e.g., HMDI) reacted with one mole of another compound such as, for example, a triol (e.g., trimethylolpropane).

Examples of suitable blocking agents include malonates, such as ethyl malonate and diisopropyl malonte, acetylacetone, ethyl acetoacetate, 1-phenyl-3-methyl-5-pyrazolone, pyrazole, 3-methyl pyrazole, 3,5 dimethyl pyrazole, hydroxylamine, thiophenol, caprolactam, pyrocatechol, propyl mercaptan, N-methyl aniline, amines such as diphenyl amine and diisopropyl amine, phenol, 2,4-diisobutylphenol, methyl ethyl ketoxime, .alpha.-pyrrolidone, alcohols such as methanol, ethanol, butanol and t-butyl alcohol, ethylene imine, propylene imine, benzotriazoles such as benzotriazole, 5-methylbenzotriazole, 6-ethylbenzotriazole, 5-chlorobenzotriazole, and 5-nitrobenzotriazole, methyl ethyl ketoxime (MEKO), diisopropylamine (DIPA), and combinations thereof.

The level of curing agent (i.e., crosslinker) required will depend on the type of curing agent, the time and temperature of the bake, and the molecular weight of the polymer. If used, the crosslinker is typically present in an amount of up to 50 wt-%, preferably up to 30 wt-%, and more preferably up to 15 wt-%. If used, the crosslinker is typically present in an amount of at least 0.1 wt-%, more preferably at least 1 wt-%, and even more preferably at least 1.5 wt-%. These weight percentages are based upon the total weight of the resin solids in the coating composition.

In some embodiments, the coating composition of the invention, based on total resin solids, includes at least 5 wt-% of blocked polymeric isocyanates, more preferably from about 5 to about 20 wt-% of blocked polymeric isocyanates, and even more preferably from about 10 to about 15 wt-% of blocked polymeric isocyanates.

A coating composition of the present invention may also include other optional polymers that do not adversely affect the coating composition or a cured coating composition resulting therefrom. Such optional polymers are typically included in a coating composition as a filler material, although they can be included as a crosslinking material, or to provide desirable properties. One or more optional polymers (e.g., filler polymers) can be included in a sufficient amount to serve an intended purpose, but not in such an amount to adversely affect a coating composition or a cured coating composition resulting therefrom.

Such additional polymeric materials can be nonreactive, and hence, simply function as fillers. Such optional nonreactive filler polymers include, for example, polyesters, acrylics, polyamides, polyethers, and novalacs. Alternatively, such additional polymeric materials or monomers can be reactive with other components of the composition (e.g., the acid-functional polymer). If desired, reactive polymers can be incorporated into the compositions of the present invention, to provide additional functionality for various purposes, including crosslinking. Examples of such reactive polymers include, for example, functionalized polyesters, acrylics, polyamides, and polyethers. Preferred optional polymers are substantially free of mobile BPA and aromatic glycidyl ether compounds (e.g., BADGE, BFDGE and epoxy novalacs).

A coating composition of the present invention may also include other optional ingredients that do not adversely affect the coating composition or a cured coating composition resulting therefrom. Such optional ingredients are typically included in a coating composition to enhance composition esthetics, to facilitate manufacturing, processing, handling, and application of the composition, and to further improve a particular functional property of a coating composition or a cured coating composition resulting therefrom.

Such optional ingredients include, for example, catalysts, dyes, pigments, toners, extenders, fillers, lubricants, anticorrosion agents, flow control agents, thixotropic agents, dispersing agents, antioxidants, adhesion promoters, light stabilizers, surfactants, and mixtures thereof. Each optional ingredient is included in a sufficient amount to serve its intended purpose, but not in such an amount to adversely affect a coating composition or a cured coating composition resulting therefrom.

One preferred optional ingredient is a catalyst to increase the rate of cure. Examples of catalysts, include, but are not limited to, strong acids (e.g., dodecylbenzene sulphonic acid (DDBSA, available as CYCAT 600 from Cytec), methane sulfonic acid (MSA), p-toluene sulfonic acid (pTSA), dinonylnaphthalene disulfonic acid (DNNDSA), and triflic acid), quaternary ammonium compounds, phosphorous compounds, and tin and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art. If used, a catalyst is preferably present in an amount of at least 0.01 wt-%, and more preferably at least 0.1 wt-%, based on the weight of nonvolatile material. If used, a catalyst is preferably present in an amount of no greater than 3 wt-%, and more preferably no greater than 1 wt-%, based on the weight of nonvolatile material.

Another useful optional ingredient is a lubricant (e.g., a wax), which facilitates manufacture of metal closures by imparting lubricity to sheets of coated metal substrate. Preferred lubricants include, for example, Carnauba wax and polyethylene type lubricants. If used, a lubricant is preferably present in the coating composition in an amount of at least 0.1 wt-%, and preferably no greater than 2 wt-%, and more preferably no greater than 1 wt-%, based on the weight of nonvolatile material.

Another useful optional ingredient is a pigment, such as titanium dioxide. If used, a pigment is present in the coating composition in an amount of no greater than 70 wt-%, more preferably no greater than 50 wt-%, and even more preferably no greater than 40 wt-%, based on the total weight of solids in the coating composition.

Surfactants can be optionally added to the coating composition to aid in flow and wetting of the substrate. Examples of surfactants, include, but are not limited to, nonylphenol polyethers and salts and similar surfactants known to persons skilled in the art. If used, a surfactant is preferably present in an amount of at least 0.01 wt-%, and more preferably at least 0.1 wt-%, based on the weight of resin solids. If used, a surfactant is preferably present in an amount no greater than 10 wt-%, and more preferably no greater than 5 wt-%, based on the weight of resin solids.

As previously discussed, the coating composition of the invention preferably includes water and may further include one or more optional organic solvents. Preferably, the coating composition includes at least about 20 wt-%, more preferably at least about 25 wt-%, and even more preferably at least about 30 wt-% of water, based on the weight of the coating composition. In some embodiments, the coating composition includes less than about 60 wt-%, more preferably less than about 50 wt-%, and even more preferably less than about 40 wt-% of water, based on the weight of the coating composition.

In certain embodiments, such as example certain coil coating applications, the coating composition preferably includes one or more organic solvents in an amount of at least about 10 wt-%, more preferably at least about 20, and even more preferably at least about 25 wt-%, based on the weight of the coating composition. In some embodiments, the coating composition includes less than about 70 wt-%, more preferably less than about 60 wt-%, and even more preferably less than about 45 wt-% of organic solvent, based on the weight of the coating composition. While not intending to be bound by any theory, the inclusion of a suitable amount of organic solvent is advantageous for certain coil coating applications to modify flow and leveling of the coating composition, control blistering, and maximize the line speed of the coil coater. Moreover, vapors generated from evaporation of the organic solvent during cure of the coating may be used to fuel the curing ovens.

The coating composition preferably has a total solids content of from about 10 to about 70 wt-%, more preferably from about 20 to about 50 wt-%, and even more preferably from about 30 to about 40 wt-%, based on the weight of the coating composition.

In one embodiment, the coating composition includes 5-65 wt-% of the latex polymer (more preferably 15-55 wt-%, even more preferably 25-45 wt-%), 20-60 wt-% of water (more preferably 25-50 wt-%, even more preferably 30-40 wt-%), and 10-70 wt-% of organic solvent (more preferably 20-60 wt-%, even more preferably 25-45 wt-%).

As described above, the coating compositions of the present invention are particularly well adapted for use on food and beverage cans (e.g., two-piece cans, three-piece cans, etc.). Two-piece cans are manufactured by joining a can body (typically a drawn metal body) with a can end (typically a drawn metal end). The coatings of the present invention are suitable for use in food or beverage contact situations and may be used on the inside of such cans. They are particularly suitable for spray applied, liquid coatings for the interior of two-piece drawn and ironed beverage cans and coil coatings for beverage can ends. The present invention also offers utility in other applications. These additional applications include, but are not limited to, wash coating, sheet coating, and side seam coatings (e.g., food can side seam coatings). The coating composition may also be useful in medical packaging applications, including, for example, on surfaces of metered-dose inhalers ("MDIs"), including on drug-contact surfaces.

Spray coating includes the introduction of the coated composition into the inside of a preformed packaging container. Typical preformed packaging containers suitable for spray coating include food cans, beer and beverage containers, and the like. The spray preferably utilizes a spray nozzle capable of uniformly coating the inside of the preformed packaging container. The sprayed preformed container is then subjected to heat to remove the residual solvents and harden the coating.

A coil coating is described as the coating of a continuous coil composed of a metal (e.g., steel or aluminum). Once coated, the coating coil is subjected to a short thermal, ultraviolet, and/or electromagnetic curing cycle, for hardening (e.g., drying and curing) of the coating. Coil coatings provide coated metal (e.g., steel and/or aluminum) substrates that can be fabricated into formed articles, such as two-piece drawn food cans, three-piece food cans, food can ends, drawn and ironed cans, beverage can ends, and the like.

A wash coating is commercially described as the coating of the exterior of two-piece drawn and ironed ("D&I") cans with a thin layer of protectant coating. The exterior of these D&I cans are "wash-coated" by passing pre-formed two-piece D&I cans under a curtain of a coating composition. The cans are inverted, that is, the open end of the can is in the "down" position when passing through the curtain. This curtain of coating composition takes on a "waterfall-like" appearance. Once these cans pass under this curtain of coating composition, the liquid coating material effectively coats the exterior of each can. Excess coating is removed through the use of an "air knife." Once the desired amount of coating is applied to the exterior of each can, each can is passed through a thermal, ultraviolet, and/or electromagnetic curing oven to harden (e.g., dry and cure) the coating. The residence time of the coated can within the confines of the curing oven is typically from 1 minute to 5 minutes. The curing temperature within this oven will typically range from 150° C. to 220° C.

A sheet coating is described as the coating of separate pieces of a variety of materials (e.g., steel or aluminum) that have been pre-cut into square or rectangular "sheets." Typical dimensions of these sheets are approximately one square meter. Once coated, each sheet is cured. Once hardened (e.g., dried and cured), the sheets of the coated substrate are collected and prepared for subsequent fabrication. Sheet coatings provide coated metal (e.g., steel or aluminum) substrate that can be successfully fabricated into formed articles, such as two-piece drawn food cans, three-piece food cans, food can ends, drawn and ironed cans, beverage can ends, and the like.

A side seam coating is described as the spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically requires a layer of liquid coating, which protects the exposed "weld" from subsequent corrosion or other effects to the contained foodstuff The liquid coatings that function in this role are termed "side seam stripes." Typical side seam stripes are spray applied and cured quickly via residual heat from the welding operation in addition to a small thermal, ultraviolet, and/or electromagnetic oven.

Other commercial coating application and curing methods are also envisioned, for example, electrocoating, extrusion coating, laminating, powder coating, and the like.

Preferred coatings of the present invention display one or more of the properties described in the Examples Section. More preferred coatings of the present invention display one or more of the following properties: metal exposure value of less than 3 mA; metal exposure value after drop damage of less than 3.5 mA; global extraction results of less than 50 ppm; adhesion rating of 10; blush rating of at least 7; slight or no crazing in a reverse impact test; no craze (rating of 10) in a dome impact test; feathering below 0.2 inch; COF range of 0.055 to 0.095; an initial end continuity of less than 10 mA (more preferably less than 5, 2, or 1 mA); and after pasteurization or retort, a continuity of less than 20 mA.

EXAMPLES

The following examples are offered to aid in understanding of the present invention and are not to be construed as limiting the scope thereof. Unless otherwise indicated, all parts and percentages are by weight.

Curing Conditions

For beverage inside spray bakes, the curing conditions involve maintaining the temperature measured at the can dome at 188° C. to 199° C. for 30 seconds.

For beverage end coil bakes, the curing conditions involve the use of a temperature sufficient to provide a peak metal temperature within the specified time (e.g., 10 seconds at 204° C. means 10 seconds, in the oven, for example, and a peak metal temperature achieved of 204° C.).

The constructions cited were evaluated by tests as follows.

Initial Metal Exposure

This test method determines the amount of the inside surface of the can that has not been effectively coated by the sprayed coating. This determination is made thorough the use of an electrically conductive solution (1% NaCl in deionized water). The coated can is filled with this room-temperature conductive solution, and an electrical probe is attached in contact to the outside of the can (uncoated, electrically conducting). A second probe is immersed in the salt solution in the middle of the inside of the can. If any uncoated metal is present on the inside of the can, a current is passed between these two probes and registers as a value on an LED display. The LED displays the conveyed currents in milliamps (mA). The current that is passed is directly proportional to the amount of metal that has not been effectively covered with coating. The goal is to achieve 100% coating coverage on the inside of the can, which would result in an LED reading of 0.0 mA. Preferred coatings give metal exposure values of less than 3 mA, more preferred values of less than 2 mA, and even more preferred values of less than 1 mA. Commercially acceptable metal exposure values are typically less than 2.0 mA on average.

Metal Exposure after Drop Damage

Drop damage resistance measures the ability of the coated container to resist cracks after being in conditions simulating dropping of a filled can. The presence of cracks is measured by passing electrical current via an electrolyte solution, as previously described in the Metal Exposure section. A coated container is filled with the electrolyte solution and the initial metal exposure is recorded. The can is then filled with water and dropped through a tube from a specified height onto an inclined plane, causing a dent in the chime area. The can is then turned 180 degrees, and the process is repeated. Water is then removed from the can and metal exposure is again measured as described above. If there is no damage, no change in current (mA) will be observed. Typically, an average of 6 or 12 container runs is recorded. Both metal exposures results before and after the drop are reported. The lower the milliamp value, the better the resistance of the coating to drop damage. Preferred coatings give metal exposure values after drop damage of less than 3.5 mA, more preferred valued of less than 2.5 mA, and even more preferred values of less than 1.5 mA.

Solvent Resistance

The extent of "cure" or crosslinking of a coating is measured as a resistance to solvents, such as methyl ethyl ketone (MEK, available from Exxon, Newark, N.J.) or isopropyl alcohol (IPA). This test is performed as described in ASTM D 5402-93. The number of double-rubs (i.e., one back- and forth motion) is reported.

Global Extractions

The global extraction test is designed to estimate the total amount of mobile material that can potentially migrate out of a coating and into food packed in a coated can. Typically coated substrate is subjected to water or solvent blends under a variety of conditions to simulate a given end use. Acceptable extraction conditions and media can be found in 21CFR 175.300 paragraphs (d) and (e). The allowable global extraction limit as defined by the FDA regulation is 50 parts per million (ppm).

The extraction procedure used in the current invention is described in 21CFR 175.300 paragraph (e) (4) (xv) with the following modifications to ensure worst-case scenario performance: 1) the alcohol content was increased to 10% by weight and 2) the filled containers were held for a 10-day equilibrium period at 100° F. These conditions are per the FDA publication "Guidelines for Industry" for preparation of Food Contact Notifications. The coated beverage can was filled with 10 weight percent aqueous ethanol and subjected to pasteurization conditions (150° F.) for 2 hours, followed by a 10-day equilibrium period at 100° F. Determination of the amount of extractives was determined as described in 21CFR 175.300 paragraph (e) (5), and ppm values were calculated based on surface area of the can (no end) of 44 square inches with a volume of 355 ml. Preferred coatings give global extraction results of less than 50 ppm, more preferred results of less than 10 ppm, even more preferred results of less than 1 ppm. Most preferably, the global extraction results are optimally non-detectable.

Adhesion

Adhesion testing is performed to assess whether the coating adheres to the coated substrate. The adhesion test was performed according to ASTM D 3359—Test Method B, using SCOTCH 610 tape, available from 3M Company of Saint Paul, Minn. Adhesion is generally rated on a scale of 0-10 where a rating of "10" indicates no adhesion failure, a rating of "9" indicates 90% of the coating remains adhered, a rating of "8" indicates 80% of the coating remains adhered, and so on. Adhesion ratings of 10 are typically desired for commercially viable coatings.

Blush Resistance

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-10 where a rating of "10" indicates no blush and a rating of "0" indicates complete whitening of the film. Blush ratings of at least 7 are typically desired for commercially viable coatings and optimally 9 or above.

Process or Retort Resistance

This is a measure of the coating integrity of the coated substrate after exposure to heat and pressure with a liquid such as water. Retort performance is not necessarily required for all food and beverage coatings, but is desirable for some product types that are packed under retort conditions. The procedure is similar to the Sterilization or Pasteurization test. Testing is accomplished by subjecting the substrate to heat ranging from 105-130° C. and pressure ranging from 0.7 to 1.05 kg/cm$^2$ for a period of 15 to 90 minutes. For the present evaluation, the coated substrate was immersed in deionized water and subjected to heat of 121° C. (250° F.) and pressure of 1.05 kg/cm$^2$ for a period of 90 minutes. The coated substrate was then tested for adhesion and blush as described above. In food or beverage applications requiring retort performance, adhesion ratings of 10 and blush ratings of at least 7 are typically desired for commercially viable coatings.

Crazing—Reverse Impact Resistance

The reverse impact measures the coated substrate's ability to withstand the deformation encountered when impacted by a steel punch with a hemispherical head. For the present evaluation, coated substrate was subjected to 12 in-lbs (1.36 N m) of force using BYK-Gardner "overall" Bend and Impact Tester and rated visually for micro-cracking or micro-fracturing—commonly referred to as crazing. Test pieces were impacted on the uncoated or reverse side. A rating of 10 indicates no craze and suggests sufficient flexibility and cure. A rating of 0 indicates complete failure. Commercially viable coatings preferably show slight or no crazing on a reverse impact test.

Impact on Dome

Dome impact was evaluated by subjecting the dome apex of a 12 oz. beverage can to a reverse impact as described in the previous section. Craze was evaluated after impact. A rating of 10 indicates no craze and suggests sufficient flexibility and cure. A rating of 0 indicates complete failure. Coatings for beverage can interiors preferably show no craze (rating of 10) on a dome impact.

Joy Detergent Test

A 1% solution of JOY Detergent (available from Procter & Gamble) in deionized water is prepared and heated to 82° C. (180° F.). Coated panels are immersed in the heated solution for 10 minutes and then removed, rinsed, and dried. Samples are then evaluated for adhesion and blush, as previously described. Commercially viable beverage interior coatings preferably give adhesion ratings of 10 and blush ratings of at least 7, optimally at least 9, in the detergent test.

Feathering

Feathering is a term used to describe the adhesion loss of a coating on the tab of a beverage can end. When a beverage can is opened, a portion of free film may be present across the opening of the can if the coating loses adhesion on the tab. This is feathering.

To test feathering, a "tab" is scored on the backside of a coated panel, with the coated side of the panel facing downward. The test piece is then pasteurized as described under the Pasteurization section below.

After pasteurization, pliers are used to bend the cut "tab" to a 90-degree angle away from the coated side of the substrate. The test piece is then placed on a flat surface, coated side down. The cut "tab" is gripped using pliers and the "tab" is pulled from the test panel at an angle of 180 degrees until it is completely removed. After removing the "tab," any coating that extends into the opening on the test panel is measured. The distance of the greatest penetration (feathering) is reported in inches. Coatings for beverage ends preferably show feathering below 0.2 inch (0.508 cm), more preferably below 0.1 inch (0.254 cm), most preferably below 0.05 inch (0.127 cm), and optimally below 0.02 inch (0.051 cm).

Dowfax Detergent Test

The "Dowfax" test is designed to measure the resistance of a coating to a boiling detergent solution. This is a general test run for beverage end coatings and is mainly used to evaluate adhesion. Historically, this test was used to indicate problems with the interaction of coating to substrate pretreatment. The solution is prepared by mixing 5 ml of Dowfax 2A1 (product of Dow Chemical) into 3000 ml of deionized water. Typically, coated substrate strips are immersed into the boiling Dowfax solution for 15 minutes. The strips are then rinsed and cooled in deionized water, dried, and then tested and rated for blush and adhesion as described previously. Preferred beverage end coatings provide adhesion ratings of 10 and blush ratings of at least 4, more preferably 6 or above in the Dowfax detergent test.

Sterilization or Pasteurization

The sterilization or pasteurization test determines how a coating withstands the processing conditions for different types of food products packaged in a container. Typically, a coated substrate is immersed in a water bath and heated for 5-60 minutes at temperatures ranging from 65° C. to 100° C. For the present evaluation, the coated substrate was immersed in a deionized water bath for 45 minutes at 85° C. The coated substrate was then removed from the water bath and tested for coating adhesion and blush as described above. Commercially viable coatings preferably provide adequate pasteurization resistance with perfect adhesion (rating of 10) and blush ratings of at least 5, optimally at least 9.

Coefficient of Friction

Coefficient of friction (COF) is a measurement of lubricity of a coating and is used to give an indication of how a cured coating will perform on commercial fabrication equipment and presses. Typically, lubricants are added to coatings requiring aggressive post application fabrication to give the appropriate lubricity.

For the present evaluation, an Altek Mobility/Lubricity Tester Model 9505AE with a chart recorder was used to measure the COF of cured beverage end coatings on aluminum substrates. The instrument works by pulling a sled with steel balls attached to a loadbar across the surface of the coated substrate, and the COF is charted out as resistance on 0-10 scale chart paper. Each unit equals 0.25 COF units. Coatings of the present invention are formulated to give a preferred COF range of 0.055 to 0.095.

Fabrication or End Continuity

This test measures the ability of a coated substrate to retain its integrity as it undergoes the formation process necessary to produce a beverage can end. It is a measure of the presence or absence of cracks or fractures in the formed end. The end is typically placed on a cup filled with an electrolyte solution. The cup is inverted to expose the surface of the end to the electrolyte solution. The amount of electrical current that passes through the end is then measured. If the coating remains intact (no cracks or fractures) after fabrication, minimal current will pass through the end.

For the present evaluation, fully converted 202 standard opening beverage ends were exposed for a period of 4 seconds to a room-temperature electrolyte solution comprised of 1% NaCl by weight in deionized water. The coating to be evaluated was present on the interior surface of the beverage end at a dry film thickness of 6 to 7.5 milligrams per square inch ("msi") (or 9.3 to 11.6 grams per square meter), with 7 msi being the target thickness. Metal exposure was measured using a WACO Enamel Rater II, available from the Wilkens-Anderson Company, Chicago, Ill., with an output voltage of 6.3 volts. The measured electrical current, in milliamps, is reported. End continuities are typically tested initially and then after the ends are subjected to pasteurization or retort.

Preferred coatings of the present invention initially pass less than 10 milliamps (mA) when tested as described above, more preferably less than 5 mA, most preferably less than 2 mA, and optimally less than 1 mA. After pasteurization or retort, preferred coatings give continuities of less than 20 mA, more preferably less than 10 mA, even more preferably less than 5 mA, and even more preferably less than 2 mA.

The following table lists some of the raw materials and ingredients used in the following examples. Alternative materials or suppliers may be substituted as is appreciated to one skilled in the art.

| Chemical Name | Trade Name | Supplier | Location |
| --- | --- | --- | --- |
| Glacial Methacrylic Acid | | Rohm & Haas | Philadelphia, PA |
| Butyl Acrylate | | Rohm & Haas | Philadelphia, PA |
| Styrene | | Rohm & Haas | Philadelphia, PA |
| Benzoyl Peroxide | | Norac Company | Helena, AR |
| Butanol | | Dow | Midland, MI |
| Ethylene Glycol Butyl ether | Butyl Cellosolve/ Dowanol EB | Dow | Midland, MI |
| Butyl Methacrylate | | Rohm & Haas | Philadelphia, PA |
| t-Butyl peroctoate | | Arkema | Philadelphia, PA |
| Ethyl acrylate | | Rohm & Haas | Philadelphia, PA |
| Acrylic Acid | | Rohm & Haas | Philadelphia, PA |
| Hydroxypropylmethacrylate | ROCRYL 410 | Rohm & Haas | Philadelphia, PA |
| Hydroxyethyl methacrylate | ROCRYL 400 | Rohm & Haas | Philadelphia, PA |
| Dimethylethanol amine | | Huntsman Chemical | Dallas, TX |
| Glycidyl methacrylate | SR 379 | Sartomer, Inc | Warrington, PA |
| Hydrogen peroxide | | Ashland Chemical | Pittsburgh, PA |
| Benzoin | | Estron | Calvert City, KY |
| N--isobutoxymethyl | CYLINK IBMA | Cytec Ind. | West Patterson, NJ |

| Chemical Name | Trade Name | Supplier | Location |
|---|---|---|---|
| acrylamide | monomer | | |
| Amyl alcohol | | Dow | Midland, MI |
| Propylene glycol n-butyl ether | DOWANOL PNB | Dow | Midland, MI |
| Secondary alcohol ethoxylate | TERGITOL 15-S-7 | Dow | Midland, MI |
| sec-butanol | | Dow | Midland, MI |
| Polyethylene wax | Slipayd 404 | Elementis | Staines, UK |
| Thermoset Phenol Based Phenolic | SD-912B | Valspar | Minneapolis, MN |
| Carnauba wax emulsion | Michemlube 160 PFE | Michelman | Cincinnati, OH |
| Isooctyl alcohol | | Aldrich Chemical | Milwaukee, WI |
| Polyethylene wax | Lanco Glidd 5118 | Lubrizol | Wickliffe, OH |
| Dipropylene glycol | | Aldrich Chemical | Milwaukee, WI |
| Isophthalic acid | | BP Amoco | Chicago, IL |
| Dibutyl tin oxide | Fastcat 4201 | Arkema | Philadelphia, PA |
| Xylene | | Exxon | Newark, NJ |
| Trimellitic anhydride | | BP Amoco | Chicago, IL |
| Iron Complex | Hamp-OL 4.5% Iron | Traylor Chemical | Orlando, FL |
| Erythorbic acid | | Aldrich Chemical | Milwaukee, WI |
| t-butyl hydroperoxide | Trigonox A-W70 | Akzo | Philadelphia, PA |
| Ethylene glycol | | Ashland Chemical | Pittsburgh, PA |
| Sebacic acid | | Ivanhoe Industries | Tampa. FL |
| 1,4-cyclohexane dimethanol 90% in water | CHDM-90 | Eastman | Kingsport, TN |
| Butyl Stannoic acid | Fastcat 4100 | Arkema | Philadelphia, PA |
| 4-Hydroxybenzoic acid | | Acros Organics through Fisher Scientific | Houston, TX |
| 1,4-Cyclohexane dimethanol diglycidyl ether | Erisys GE-22 | CVC Specialty Chemicals | Maple Shade, NJ |
| Ethyltriphenyl phosphonium iodide | Catalyst 1201 | Deepwater Chemicals | Woodward, OK |
| Succinic ahydride | | JLM Marketing | Tampa, FL |
| Bisphenol A | | Dow | Midland, MI |
| Bispenol A diglycidyl ether | Epon 828 | Resolution Performance Products | Houston, TX |
| Methylisobutyl ketone | | Dow | Midland, MI |
| Dibasic ester | | Dupont | Wilmington, DE |
| Propylene glycol methyl ether | Dowanol PM | Dow | Midland, MI |

Example 1

Run 1—Preparation of Acid-Functional Acrylic

A premix of 512.6 parts glacial methacrylic acid (MAA), 512.6 parts butyl acrylate (BA), 114.0 parts styrene, and 73.2 parts benzoyl peroxide (70% water wet) was prepared in a separate vessel. A 3-liter flask was equipped with a stirrer, reflux condenser, thermocouple, heating mantle, and nitrogen blanket. Ten percent of the premix was added to the flask along with 405.9 parts butanol and 30.6 parts deionized water. To the remaining premix were added 496.1 parts butanol and 38.3 parts deionized water. With the nitrogen blanket flowing in the flask, the contents were heated to 93° C. At 93° C., external heating was stopped and the material was allowed to increase in temperature for 15 minutes. After 15 minutes, the batch was at 97° C., and the remaining premix was added uniformly over 2 hours maintaining 97° C. to 100° C. When the premix addition was complete, the premix vessel was rinsed with 5 parts butanol. The batch was held at temperature for 2.5 hours. The heating was discontinued and 317.7 parts butyl cellosolve was added. The resulting acrylic prepolymer was 44.3% solids (NV), with an acid number of 313 and a Brookfield viscosity (as determined by ASTM D-2196) of 4,990 centipoise (cps).

Example 1

Run 2—Preparation of Acid-Functional Acrylic

A premix of 677.7 parts glacial methacrylic acid, 677.7 parts butyl methacrylate (BMA), 150.8 parts styrene, and 96.9 parts benzoyl peroxide (70% water wet) was prepared in a separate vessel. A 5-liter flask was equipped with a stirrer, reflux condenser, thermocouple, heating mantle, and nitrogen blanket. Ten percent of the premix was added to the flask along with 536.9 parts butanol and 40.7 parts deionized water. To the remaining premix were added 758.1 parts butanol and 50.6 parts deionized water. With the nitrogen blanket flowing in the flask, the contents were heated to 93° C. At 93° C., external heating was stopped, and the material was allowed to increase in temperature for 10 minutes. After 10 minutes, the batch was at 98° C., and the remaining premix was added uniformly over 2 hours maintaining 97° C. to 100° C. The batch was held at temperature for 3 hours. The heating was discontinued and the batch cooled. The resulting acrylic prepolymer was 49.9% NV, with an acid number of 304 and a Brookfield viscosity of 101,000 cps.

Example 1

Run 3—Preparation of Acid-Functional Acrylic

A premix of 802.6 parts glacial methacrylic acid, 807 parts butyl methacrylate, 178.5 parts styrene, 80.3 parts t-butyl peroctoate, 838.5 parts butanol, and 59.9 parts deionized water was prepared in a separate vessel. A 5-liter flask was equipped with a stirrer, reflux condenser, thermocouple, heating mantle, and nitrogen blanket. Added to the 5 liter flask were 635.8 parts butanol and 48.1 parts deionized water. The flask was heated to 94° C. At 94° C., 12.5 parts t-butyl peroctoate were added. The batch was held for 5 minutes after which the premix was added over 2.5 hours. A second premix containing 59.2 parts butanol and 16.1 parts t-butyl peroctoate was prepared. When the addition of the first premix was complete the second premix was added over 30 minutes. Once complete, the batch was held for 30 minutes. A chase of 3.4 parts t-butyl peroctoate was added and the batch held for 2 hours. After the 2-hour hold time, the heat was discontinued and the batch cooled. The resulting acrylic prepolymer was 50.1% NV, with an acid number of 292 and a Brookfield viscosity of 150,000 cps.

Example 1

Run 4—Preparation of Acid-Functional Acrylic

A premix of 802.6 parts glacial methacrylic acid, 445.9 parts ethyl acrylate, 535.1 parts styrene, 108.6 parts t-butyl peroctoate, 838.5 parts butanol, and 59.9 parts deionized water was prepared in a separate vessel. A 5-liter flask was equipped with a stirrer, reflux condenser, thermocouple, heating mantle, and nitrogen blanket. Added to the 5-liter flask was 635.8 parts butanol and 48.1 parts deionized water. The flask was heated to 94° C. At 94° C., 16.6 parts t-butyl peroctoate was added. The batch was held for 5 minutes after which the premix was added over 2.5 hours. A second premix containing 59.2 parts butanol and 21.2 parts t-butyl peroctoate was prepared. When the addition of the first premix was complete, the second premix was added over 30 minutes. Once complete, the batch was held for 30 minutes. A chase of 4.6 parts t-butyl peroctoate was added and the batch held for 2 hours. After the 2-hour hold, the heat was discontinued and the batch cooled. The resulting acrylic prepolymer was 49.8% NV, with an acid number of 303 and a Brookfield viscosity of 21,650 cps.

Example 1

Runs 5-11

Using techniques from Example 1: Run 4, the systems shown in Table 1 were prepared.

TABLE 1

| Ex. 1: | Acid-Functional Acrylics | | | | | | | |
|---|---|---|---|---|---|---|---|---|
| | Run 4 | Run 5 | Run 6 | Run 7 | Run 8 | Run 9 | Run 10 | Run 11 |
| MAA | 45 | 30 | 45 | 0 | 30 | 45 | 25 | 45 |
| EA | 25 | 50 | 45 | 23 | 0 | 15 | 30 | 0 |
| Styrene | 30 | 5 | 10 | 10 | 25 | 0 | 25 | 10 |
| BMA | 0 | 15 | 0 | 31 | 0 | 40 | 0 | 45 |
| AA[1] | 0 | 0 | 0 | 36 | 0 | 0 | 0 | 0 |
| BA | 0 | 0 | 0 | 0 | 45 | 0 | 0 | 0 |
| HPMA[2] | 0 | 0 | 0 | 0 | 0 | 0 | 20 | 0 |
| Solids | 49.8% | 62.8% | 49.4% | 51.4% | 55.4% | 49.6% | 50.5% | 49.7% |
| Acid No. | 303 | 198 | 295 | 246 | 192 | 293 | 155 | 292 |
| Brookfield Visc. (cps) | 21,650 | 50,000 | 8,730 | 1,100 | 6,660 | 27,800 | 3,532 | 106,000 |

[1]Glacial acrylic acid
[2]Hydroxypropyl methacrylate

Example 1

Run 12—Preparation of Acid-Functional Acrylic

A premix of 803.4 parts glacial methacrylic acid, 446.3 parts ethyl acrylate (EA), 535.5 parts styrene, 153 parts benzoyl peroxide (70% water wet), 839.2 parts butanol, and 60 parts deionized water was prepared in a separate vessel. A 5-liter flask was equipped with a stirrer, reflux condenser, thermocouple, heating mantle and nitrogen blanket. To the flask, 636.3 parts butanol and 48.2 parts deionized water were added and heated to 97° C. to 100° C. with a nitrogen blanket flowing in the flask. The premix was added uniformly over 2.5 hours maintaining 97° C. to 100° C. When the premix was in, the premix vessel was rinsed with 59.2 parts butanol and added to the flask. The batch was held at temperature for 2 hours. The heating was discontinued and the batch cooled. The resulting acrylic prepolymer was 50.2% NV, with an acid number of 301 and a Brookfield viscosity of 25,400 cps.

Example 1

Runs 13-15

Using techniques from Example 1: Run 12 the systems shown in Table 2 were prepared.

TABLE 2

| | Acid-Functional Acrylics | | | |
|---|---|---|---|---|
| | Example No. 1: | | | |
| | Run 12 | Run 13 | Run 14 | Run 15 |
| MAA | 45 | 25 | 35 | 25 |
| EA | 25 | 25 | 25 | 33 |
| Styrene | 30 | 30 | 30 | 22 |
| HPMA | 0 | 20 | 10 | 20 |
| Solids | 51.2% | 50.2% | 50.0% | 50.3% |
| Acid Number | 301 | 171 | 234 | 169 |

TABLE 2-continued

Acid-Functional Acrylics

Example No. 1:

|  | Run 12 | Run 13 | Run 14 | Run 15 |
|---|---|---|---|---|
| Brookfield Viscosity (cps) | 25,400 | 2,820 | 6,020 | 2,220 |

Example 2

Run 1—Preparation of Salt of Acid-Functional Acrylic

A 3-liter flask was equipped with a stirrer, reflux condenser, Dean Stark Tube, thermocouple, heating mantle, and nitrogen blanket. Into the flask was added 711.5 parts of Example 1: Run 1 acrylic, 762.9 parts deionized water, and 56.9 parts dimethyl ethanol amine (DMEA). The contents were heated to reflux and 553 parts were distilled from the flask. After distillation was complete, 598 parts of deionized water were added. The batch was cooled giving an acrylic solution at 20.3% solids and 307 acid number.

Example 2

Run 2—Preparation of Salt of Acid-Functional Acrylic

A 5-liter flask was equipped with a stirrer, reflux condenser, Dean Stark Tube, thermocouple, heating mantle, and nitrogen blanket. Into the flask was added 1853 parts of Example 1: Run 2 acrylic, 2220.4 parts deionized water, and 163.3 parts dimethyl ethanol amine. The contents were heated to reflux and 1587 parts were distilled from the flask. After distillation was complete, 1718 parts of deionized water were added. The batch was cooled giving an acrylic solution at 22.2% solids, 294 acid number, pH of 6.0, and a viscosity of 13 seconds (Number 4 Ford cup viscosity as determined by ASTM D-1200).

Example 2

Run 3—Preparation of Salt of Acid-Functional Acrylic

A 5-liter flask was equipped with a stirrer, reflux condenser, Dean Stark Tube, thermocouple, heating mantle, and nitrogen blanket. Into the flask was added 1852.3 parts of Example 1: Run 3 acrylic, 2219 parts deionized water, and 163 parts dimethyl ethanol amine The contents were heated to reflux and 1463 parts were distilled from the flask. After distillation was complete, 1581 parts of deionized water were added. The batch was cooled giving an acrylic solution at 21.6% solids, 284 acid number, pH of 6.23 and a viscosity of 13 seconds (Number 4 Ford cup).

Example 2

Run 4—Preparation of Salt of Acid Functional Acrylic

A 5-liter flask was equipped with a stirrer, reflux condenser, Dean Stark Tube, thermocouple, heating mantle, and nitrogen blanket. Into the flask was added 1799.2 parts of Example 1: Run 4 acrylic, 2155.9 parts deionized water, and 158.6 parts dimethyl ethanol amine The contents were heated to reflux and 1541 parts were distilled from the flask. After distillation was complete, 1615 parts of deionized water were added. The batch was cooled giving an acrylic solution at 22.1% solids, 302 acid number, pH of 6.55 and a Brookfield viscosity of 2060 cps.

Example 2

Runs 5-15

Using techniques from Example 2: Run 4 the systems shown in Table 3 were prepared. Each run of Example 2 used the correspondingly numbered run from Example 1. That is, Example 2: Run 5 used the acrylic prepolymer from Example 1: Run 5, etc.

TABLE 3

Acid-Functional Acrylic Salts

Ex 2:

|  | Run 4 | Run 5 | Run 6 | Run 7 | Run 8 | Run 9 |
|---|---|---|---|---|---|---|
| Solids | 22.1% | 21.4% | 21.6% | 22.0% | 21.7% | 21.3% |
| Acid No. | 302 | 198 | 291 | 248 | 193 | 291 |
| PH | 6.55 | 6.49 | 5.96 | 5.95 | 7.30 | 6.26 |
| Viscosity[1] | 2,060 cps | 1,050 cps | 1,770 cps | — | — | 20 sec |

Ex. 2:

|  | Run 10 | Run 11 | Run 12 | Run 13 | Run 14 | Run 15 |
|---|---|---|---|---|---|---|
| Solids | 21.7% | 21.7% | 22.0% | 21.3% | 21.7% | 22.2% |
| Acid No. | 153 | 300 | 291 | 169 | 231 | 271 |
| pH | 7.29 | 6.54 | 6.37 | 6.72 | — | 6.67 |
| Viscosity[1] | 881 cps | 15 sec | 167 cps | 304 cps | 248 cps | 1900 cps |

[1]Brookfield viscosity values in cps and Number 4 Ford cup viscosity values in sec.

Example 3

Run 1—Emulsion

A 1-liter flask was equipped with a stirrer, reflux condenser, thermocouple, heating mantle, and nitrogen blanket. Into the flask were added 313.9 parts of Example 2: Run 3 salt and 267.3 parts deionized water. The contents of the flask were heated to 75° C. at 280 revolutions per minute (RPM). In a separate vessel, a premix of 71.4 parts styrene, 116.3 parts butyl methacrylate, and 16.3 parts glycidyl methacrylate (GMA) was prepared. Once the flask was at 75° C., 10% of the premix was added followed by 2.04 parts benzoin and 20 parts deionized water. The flask was heated further to 79° C. At 79° C., 2.04 parts of 35% hydrogen peroxide was added and held for 5 minutes. After 5 minutes, the temperature control was set at 81° C. and the remaining premix was added over a period of 1 hour. When the addition was complete, 20 parts deionized water were used to rinse the residual premix into the flask. The batch was held for 10 minutes and then 0.35 part benzoin, 20 parts deionized water, and 0.35 part 35% hydrogen peroxide were added. After 2 hours the heat was removed and the batch cooled. This gave an emulsion at 31.9% solids, 63.3 acid number, pH of 6.48, and a Brookfield viscosity of 203 cps.

Example 3

Run 2—Emulsion

A 0.5-liter flask was equipped with a stirrer, reflux condenser, thermocouple, heating mantle, and nitrogen blanket. Into the flask was added 155.6 parts of Example 2: Run 4 salt and 120.6 parts deionized water. The contents of the flask were heated to 75° C. at 240 RPM. In a separate vessel, a premix of 66.3 parts styrene, 19.6 parts ethyl acrylate, and 7.5 parts glycidyl methacrylate was prepared. Once the flask was at 75° C., 10% of the premix was added followed by 0.91 part benzoin and 9.4 parts deionized water. The flask was heated further to 79° C. At 79° C., 0.91 part of 35% hydrogen peroxide was added and held for 5 minutes. After 5 minutes, the temperature control was set at 81° C. and the remaining premix was added over 1 hour. When the addition was complete, 9.4 parts deionized water were used to rinse the residual premix into the flask. The batch was held for 10 minutes and then 0.16 part benzoin, 9.4 parts deionized water, and 0.16 part 35% hydrogen peroxide were added. After 2 hours, the heat was removed and the batch cooled. This gave an emulsion at 30.9% solids, 83.8 acid number, pH of 6.70, and a viscosity of 40 seconds (Number 4 Ford cup).

Example 3

Run 3—Emulsion

A 1-liter flask was equipped with a stirrer, reflux condenser, thermocouple, heating mantle, and nitrogen blanket. Into the flask was added 311.2 parts of Example 2: Run 4 salt and 241.2 parts deionized water. The contents of the flask were heated to 75° C. at 270 RPM. In a separate vessel, a premix of 112.1 parts styrene, 59.8 parts ethyl acrylate, and 14.9 parts glycidyl methacrylate was prepared. Once the flask was at 75° C., 10% of the premix was added followed by 1.87 parts benzoin and 18.8 parts deionized water. The flask was heated further to 79° C. At 79° C., 1.87 parts of 35% hydrogen peroxide were added and held for 5 minutes. After 5 minutes, the temperature control was set at 81° C. and the remaining premix was added over 1 hour. When the addition was complete, 18.8 parts deionized water were used to rinse the residual premix into the flask. The batch was held for 10 minutes and then 0.32 part benzoin, 18.8 parts deionized water, and 0.32 part 35% hydrogen peroxide were added. After 2 hours, the heat was removed and the batch cooled. This gave an emulsion at 31.8% solids, 76.7 acid number, pH of 6.67, and a viscosity of 28 seconds (Number 4 Ford cup).

Example 3

Run 4—Emulsion

A 5-liter flask was equipped with a stirrer, reflux condenser, thermocouple, heating mantle, and nitrogen blanket. Into the flask was added 1525.0 parts of Example 2: Run 4 salt and 1219.1 parts deionized water. The contents of the flask were heated to 70° C. at 250 RPM. In a separate vessel a premix of 380.4 parts styrene, 278.3 parts butyl acrylate (BA), 194.9 parts butyl methacrylate, and 74.2 parts glycidyl methacrylate was prepared. Once the flask was at 70° C., 10% of the premix was added followed by 9.29 parts benzoin and 92.9 parts deionized water. The flask was heated further to 79° C. At 79° C., 9.29 parts of 35% hydrogen peroxide were added and held for 5 minutes. After 5 minutes, the temperature control was set at 81° C. and the remaining premix was added over 1 hour. When the addition was complete, 92.9 parts deionized water were used to rinse the residual premix into the flask. The batch was held for 10 minutes and then 1.59 parts benzoin, 92.9 parts deionized water, and 1.59 parts 35% hydrogen peroxide were added. The batch was held for 45 minutes and then 0.52 part benzoin and 0.52 part 35% hydrogen peroxide were added. After 2 hours, the heat was removed and the batch cooled. This gave an emulsion at 31.4% solids, 64.1 acid number, pH of 6.95, and a viscosity of 22 seconds (Number 4 Ford cup).

Example 3

Run 5—Emulsion

A 12-liter flask was equipped with a stirrer, reflux condenser, thermocouple, heating mantle, and nitrogen blanket. Into the flask was added 3886.5 parts of Example 2: Run 4 salt and 3022.5 parts deionized water. The contents of the flask were heated to 70° C. at 235 RPM. In a separate vessel, a premix of 771.25 parts styrene, 933.75 parts butyl acrylate, 537.5 parts butyl methacrylate, and 93.75 parts glycidyl methacrylate was prepared. Once the flask was at 70° C., 23.38 parts benzoin and 116.25 parts deionized water followed by 10% of the premix were added. The flask was heated further to 79° C. At 79° C., 23.38 parts of 35% hydrogen peroxide and 116.25 parts deionized water were added and held for 5 minutes. After 5 minutes, the temperature control was set at 81° C. and the remaining premix was added over 1 hour. When the addition was complete, 232.5 parts deionized water were used to rinse the residual premix into the flask. The batch was held for 10 minutes and then 4.0 parts benzoin, 232.5 parts deionized water, and 4.0 parts 35% hydrogen peroxide were added. The batch was held for 45 minutes and then 1.25 parts benzoin and 1.25 parts 35% hydrogen peroxide were added. After 2 hours, the heat was removed and the batch cooled. This gave an emulsion at 31.4% solids, 72.4 acid number, pH of 7.05, and a viscosity of 32 seconds (Number 4 Ford cup).

Example 3

Runs 6-10

Using the process outlined in Example 3: Run 4 the Emulsions shown in Table 4 were prepared.

TABLE 4

| | Emulsions | | | | | |
|---|---|---|---|---|---|---|
| | Example 3: | | | | | |
| | Run 4 | Run 6 | Run 7 | Run 8 | Run 9 | Run 10 |
| Acrylic salt | Ex. 2: Run 4 | Ex. 2: Run 4 | Ex. 2: Run 4 | Ex. 2: Run 4 | Ex. 2: Run 4 | Ex. 2: Run 4 |

TABLE 4-continued

Emulsions

Example 3:

| | Run 4 | Run 6 | Run 7 | Run 8 | Run 9 | Run 10 |
|---|---|---|---|---|---|---|
| Monomers | | | | | | |
| Styrene | 41.0 | 39.0 | 42.0 | 43.5 | 43.5 | 45.0 |
| BA | 30.0 | 53.0 | 54.0 | 54.5 | 54.5 | 55.0 |
| BMA | 21.0 | 0.0 | 0.0 | 0.0 | 0.0 | 0.0 |
| GMA | 8.0 | 8.0 | 4.0 | 2.0 | 2.0 | 0.0 |
| Emulsion Comments | Good Appearance | Good Appearance | Good Appearance | White-High Viscosity | White-Low Conversion | Emulsion Separated |
| Solids | 31.4% | 31.3% | 31.5% | 31.7% | 28.6% | 31.2% |
| Viscosity (No. 4 Ford Cup) | 22 sec | 51 sec | 103 sec | — | 22 sec | — |
| Brookfield Viscosity | — | 230 cps | 610 cps | 25,000 cps | — | — |
| pH | 6.95 | 7.05 | 6.88 | — | 6.65 | — |

This resin series showed that as the GMA level decreased, acceptable emulsions became more difficult to produce.

Example 3

Runs 11-18

A design experiment using Example 2: Run 9 as the acid functional acrylic salt and the process outlined above was prepared and is depicted in Table 5.

The latices from Table 5 were tested without further modification or formulation, and the results are shown in Table 6. Each composition was drawn down onto Alcoa ALX aluminum at a film weight of 7-8 milligrams per square inch (msi) (1.1-1.25 milligrams per square centimeter ($mg/cm^2$)) and cured for 10 seconds to achieve a 420° F. (215° C.) peak metal temperature in a gas fired coil oven.

TABLE 5

Emulsion Design Experiment

Example 3:

| | Run 11 | Run 12 | Run 13 | Run 14 | Run 15 | Run 16 | Run 17 | Run 18 |
|---|---|---|---|---|---|---|---|---|
| Acrylic/Monomer Ratio | 73/27 | | | | 65/35 | | | |
| | Monomer Composition 1 | | Monomer Composition 2 | | Monomer Composition 1 | | Monomer Composition 2 | |
| GMA Level | Low | High | Low | High | Low | High | Low | High |
| Monomers | | | | | | | | |
| Styrene | 42 | 39 | 33 | 33 | 43 | 41 | 33 | 33 |
| BA | 54 | 53 | 40 | 41 | 54 | 53 | 40 | 40 |
| BMA | 0 | 0 | 23 | 18 | 0 | 0 | 24 | 21 |
| GMA | 4 | 8 | 4 | 8 | 3 | 6 | 3 | 6 |
| Solids | 32.0% | 31.3% | 31.6% | 31.9% | 31.6% | 32.0% | 31.7% | 32.0% |
| Viscosity (No. 4 Ford Cup) | — | 63 sec | — | — | 35 sec | 210 sec | 42 sec | — |
| Brookfield Viscosity (cps) | 10,000 | — | 10,000 | 695 | — | — | — | 1,384 |
| Acid Number | 74.7 | 72.9 | 74.9 | 70.2 | 101 | 96.1 | 101 | 96.5 |

TABLE 6

| | Waterbased Control[1] | Ex. 3: Run 11 | Ex. 3: Run 12 | Ex. 3: Run 13 | Ex. 3: Run 14 | Ex. 3: Run 15 | Ex. 3: Run 16 | Ex. 3: Run 17 | Ex. 3: Run 18 |
|---|---|---|---|---|---|---|---|---|---|
| Beverage End Film Performance | | | | | | | | | |
| Craze | None | None | None | None | None | None | Slight | None | None |
| MEK Resistance | 19 | 5 | 6 | 3 | 7 | 5 | 6 | 4 | 8 |
| Feathering[4] | 0.343 | 0.013 | 0.020 | 0.071 | 0.003 | 0.020 | 0.013 | 0.030 | 0.013 |
| Water Retort[2] | | | | | | | | | |
| Blush | 9.5 | 10 | 9.5 | 9.5 | 9.5 | 9 | 10 | 8 | 10 |
| Adhesion | 10 | 10 | 10 | 10 | 10 | 10 | 10 | 10 | 10 |
| Pasteurization[3] | | | | | | | | | |
| Blush | 10 | 10 | 10 | 10 | 10 | 10 | 10 | 10 | 10 |
| Adhesion | 10 | 10 | 10 | 10 | 10 | 10 | 10 | 10 | 10 |
| End Continuity | | | | | | | | | |
| Initial | 0 | 0.22 | 25.3 | 11.5 | 57.8 | 17.7 | 133.5 | 27.5 | 132.2 |
| After Retort[2] | 8.4 | 31.8 | Not Tested | 31.7 | Not Tested | Not Tested | Not Tested | 34.3 | Not Tested |

[1]Commercially available beverage end coating from Valspar coded 13Q80AG.
[2]90 minutes at 121° C. (250° F.).
[3]30 minutes at 85° C. (185° F.).
[4]Performed after a 45 minutes at 85° C. (185° F.) pasteurization. Measured in centimeters.

Example 3

Runs 5b and 19-25

A design experiment using Example 2: Run 4 as the acid functional acrylic salt and the process outlined above was prepared and is depicted in Table 7. Example 3: Run 5b was included as one of the variables and was a repeat of Run 5.

The lattices from Table 7 were tested without further modification or formulation, and the results are shown in Table 8. Each composition was drawn down onto Alcoa ALX aluminum at a film weight of 7-8 msi (1.1-1.25 mg/cm$^2$) and cured for 10 seconds to achieve a 420° F. (215° C.) peak metal temperature in a gas fired coil oven.

TABLE 7

Emulsion Design Experiment

| | Example 3: | | | | | | | |
|---|---|---|---|---|---|---|---|---|
| | Run 19 | Run 20 | Run 5b | Run 21 | Run 22 | Run 23 | Run 24 | Run 25 |
| Acrylic/Monomer Ratio | | | | | | | | |
| | 73/27 | | | | 65/35 | | | |
| | Monomer Composition 1 | | Monomer Composition 2 | | Monomer Composition 1 | | Monomer Composition 2 | |
| GMA Level | | | | | | | | |
| | Low | High | Low | High | Low | High | Low | High |
| Monomers | | | | | | | | |
| Styrene | 42 | 39 | 33 | 33 | 43 | 41 | 33 | 33 |
| BA | 54 | 53 | 40 | 41 | 54 | 53 | 40 | 40 |
| BMA | 0 | 0 | 23 | 18 | 0 | 0 | 24 | 21 |
| GMA | 4 | 8 | 4 | 8 | 3 | 6 | 3 | 6 |
| Solids | 31.5% | 31.6% | 31.6% | 31.4% | 31.3% | 31.6% | 31.5% | 31.7% |
| Viscosity (No. 4 Ford Cup) | 55 sec | 60 sec | 50 sec | 56 sec | 106 sec | — | 70 sec | — |
| Brookfield Viscosity (cps) | — | — | — | — | — | 2,624 | — | 3,000 |
| Acid Number | 71.9 | 73.0 | 69.0 | 68.3 | 95.4 | 92.5 | 94.7 | 98.0 |

TABLE 8

Beverage End Film Performance

|  | Waterbased Control[1] | Ex. 3: Run 19 | Ex. 3: Run 20 | Ex. 3: Run 5b | Ex. 3: Run 21 | Ex. 3: Run 22 | Ex. 3: Run 23 | Ex. 3: Run 24 | Ex. 3: Run 25 |
|---|---|---|---|---|---|---|---|---|---|
| Craze | None | None | None | None | None | None | Slight | None | Yes |
| MEK | 19 | 4 | 7 | 4 | 10 | 6 | 11 | 4 | 6 |
| Feathering[4] | 0.343 | 0.064 | 0.051 | 0.038 | 0.033 | 0.056 | 0.013 | 0.046 | 0.013 |
| Water Retort[2] | | | | | | | | | |
| Blush | 9.5 | 9.5 | 9.5 | 10 | 10 | 9.5 | 10 | 7 | 9.5 |
| Adhesion | 10 | 10 | 10 | 10 | 10 | 10 | 10 | 10 | 10 |
| Pasteurization[3] | | | | | | | | | |
| Blush | 10 | 10 | 10 | 10 | 10 | 10 | 10 | 10 | 10 |
| Adhesion | 10 | 10 | 10 | 10 | 10 | 10 | 10 | 10 | 10 |
| End Continuity | | | | | | | | | |
| Initial | 0 | 5.5 | 2.6 | 6.0 | 12.3 | 20.2 | 61.2 | 1.9 | 93.6 |
| After Retort[2] | 8.4 | 23.5 | 143 | 23.4 | 134.0 | 78.8 | Not Tested | 52.5 | Not Tested |

[1]Commercially available beverage end coating from Valspar coded 13Q80AG.
[2]90 minutes at 121° C. (250° F.).
[3]30 minutes at 85° C. (185° F.).
[4]Performed after a 45 minutes at 85° C. (185° F.) pasteurization. Measured in centimeters.

Example 3

Runs 26-33

A design experiment using Example 2: Run 11 as the acid functional acrylic salt and the process outlined above was prepared and is depicted in Table 9.

The latices from Table 9 were tested without further modification or formulation, and the results are shown in Table 10. Each composition was drawn down onto Alcoa ALX aluminum at a film weight of 7-8 msi (1.1-1.25 mg/cm$^2$) and cured for 10 seconds to achieve a 420° F. (215° C.) peak metal temperature in a gas fired coil oven.

TABLE 9

Emulsion Design Experiment

| Example 3: | | | | | | | |
|---|---|---|---|---|---|---|---|
| Run 26 | Run 27 | Run 28 | Run 29 | Run 30 | Run 31 | Run 32 | Run 33 |
| Acrylic/Monomer Ratio | | | | | | | |
| 73/27 | | | | 65/35 | | | |
| Monomer Composition 1 | | Monomer Composition 2 | | Monomer Composition 1 | | Monomer Composition 2 | |
| GMA Level | | | | | | | |
| Low | High | Low | High | Low | High | Low | High |

| Monomers | | | | | | | | |
|---|---|---|---|---|---|---|---|---|
| Styrene | 42 | 39 | 33 | 33 | 43 | 41 | 33 | 33 |
| BA | 54 | 53 | 40 | 41 | 54 | 53 | 40 | 40 |
| BMA | 0 | 0 | 23 | 18 | 0 | 0 | 24 | 21 |
| GMA | 4 | 8 | 4 | 8 | 3 | 6 | 3 | 6 |
| Solids | 31.0% | 31.8% | 31.5% | 31.4% | 30.9% | 31.3% | 31.4% | 31.6% |
| Viscosity (No. 4 Ford Cup) | 40 sec | 48 sec | — | 17 sec | 14 sec | 16 sec | 14 sec | 16 sec |
| Brookfield Viscosity (cps) | — | — | 17,000 | — | — | — | — | — |
| Acid Number | 73.5 | 68.7 | 71.2 | 68.6 | 97.0 | 93.9 | 99.3 | 93.9 |

TABLE 10

Beverage End Film Performance of Emulsion DOE C

|  | Waterbased Control[1] | Ex. 3: Run 26 | Ex. 3: Run 27 | Ex. 3: Run 28 | Ex. 3: Run 29 | Ex. 3: Run 30 | Ex. 3: Run 31 | Ex. 3: Run 32 | Ex. 3: Run 33 |
|---|---|---|---|---|---|---|---|---|---|
| Craze | None | Slight | None | None | Yes | Yes | Yes | Yes | Yes |
| MEK | 19 | 7 | 8 | 3 | 12 | 3 | 5 | 7 | 6 |
| Feathering[4] | 0.343 | 0.046 | 0.043 | 0.013 | 0.025 | 0.013 | 0.013 | 0.020 | 0.013 |
| Water Retort[2] | | | | | | | | | |
| Blush | 9.5 | 9.5 | 10.0 | 9.5 | 10 | 2 | 10 | 3 | 9.5 |
| Adhesion | 10 | 10 | 10 | 10 | 10 | 10 | 10 | 10 | 10 |
| Pasteurization[3] | | | | | | | | | |
| Blush | 10 | 10 | 10 | 10 | 10 | 10 | 10 | 10 | 10 |
| Adhesion | 10 | 10 | 10 | 10 | 10 | 10 | 10 | 10 | 10 |
| End Continuity | | | | | | | | | |
| Initial | 0 | 82.4 | 107.4 | 12.2 | 215.6 | 178.9 | 315.9 | 161.5 | 336.9 |
| After Retort[2] | 8.4 | Not Tested | Not Tested | Not Tested | Not Tested | Not Tested | Not Tested | Not Tested | Not Tested |

[1]Commercially available beverage end coating from Valspar coded 13Q80AG.
[2]90 minutes at 121° C. (250° F.).
[3]30 minutes at 85° C. (185° F.).
[4]Performed after a 45 minutes at 85° C. (185° F.) pasteurization. Measured in centimeters.

The following are some of the conclusions drawn from results of the emulsion DOEs shown in Tables 5 through 10. The non styrene-containing acrylic stabilizer polymer from Example 2: Run 9 produced higher viscosity emulsions, which are less desirable for some end uses. The composition from Example 2: Run 4 gave better overall film performance. In general, a higher acrylic polymer/monomer ratio tended to give poorer film integrity (continuities). Higher GMA levels in the emulsion monomer mix tended to give higher emulsion viscosities and greater increases in film continuity mAs after retort. Little difference was noticed between the various co-monomer compositions, so there is latitude to vary the overall emulsion monomer composition.

Example 3

Runs 34-35

A series of emulsions, shown in Table 11 were prepared using a monomer to acid-functional acrylic ratio of 73/27 solids/solids. These systems were prepared using the process outlined in Example 3: Run 5 using Example 2: Run 4 as the acid-functional acrylic salt.

TABLE 11

Emulsion GMA Level Study

|  | Example 3: | | |
|---|---|---|---|
|  | Run 5b | Run 34 | Run 35 |
| GMA Level Monomers | 4% | 12% | 20% |
| Styrene | 33 | 33 | 33 |
| BA | 40 | 42 | 44 |
| BMA | 23 | 13 | 3 |

TABLE 11-continued

Emulsion GMA Level Study

|  | Example 3: | | |
|---|---|---|---|
|  | Run 5b | Run 34 | Run 35 |
| GMA | 4 | 12 | 20 |
| Solids | 31.6% | 31.8% | 32.0% |
| Viscosity (No. 4 Ford cup) | 50 sec | — | — |
| Brookfield Visc. (cps) | — | 1,070 | 33,950 |
| Acid Number | 69.0 | 59.5 | 44.9 |

It can be seen that as the GMA level was increased, the resulting acid number decreased, indicating the GMA consumed some of the acid groups on the acrylic polymer stabilizer.

Example 3

Runs 36-42

A series of emulsions, shown in Table 12, were prepared using a monomer to acid-functional acrylic ratio of 73/27 solids/solids. These systems were prepared using the process outlined in Example 3: Run 5b using Example 2: Run 10 as the acid-functional acrylic salt. This acrylic contains hydroxyl functionality that may theoretically co-react with the IBMA during cure.

TABLE 12

Effect of IBMA in Emulsions

Example 3:

|  | Run 36 | Run 37 | Run 38 | Run 39 | Run 40 | Run 41 | Run 42 |
|---|---|---|---|---|---|---|---|
| IBMA Level | 0% | 4% | 5% | 6% | 7% | 8% | 12% |
| Monomers | | | | | | | |
| Styrene | 33 | 26 | 26 | 26 | 26 | 26 | 26 |
| BA | 40 | 45 | 46 | 46 | 46 | 47 | 48 |
| BMA | 23 | 21 | 19 | 18 | 17 | 15 | 10 |
| GMA | 4 | 4 | 4 | 4 | 4 | 4 | 4 |
| IBMA[1] | 0 | 4 | 5 | 6 | 7 | 8 | 12 |
| Solids % | 31.4% | 31.6% | 30.9% | 30.4% | 30.4% | 30.0% | 29.8% |
| Viscosity (No. 4 Ford Cup) | 22 sec | 17 sec | 18 sec | 16 sec | 16 sec | 16 sec | 17 sec |
| Acid Number | 38.1 | 40.1 | 40.9 | 39.5 | 40.5 | 41.0 | 40.4 |

[1]N-Isobutoxymethyl acrylamide

The latices from Table 12 were tested without further modification or formulation, and the results are shown in Table 13. Each composition was drawn down onto Alcoa ALX aluminum at a film weight of 7-8 msi (1.1-1.25 mg/cm$^2$) and cured for 10 seconds to achieve a 420° F. (215° C.) peak metal temperature in a gas fired coil oven.

TABLE 13

Beverage End Continuities (IBMA Level)

Example 3:

|  | Run 36 | Run 37 | Run 38 | Run 39 | Run 40 | Run 41 | Run 42 |
|---|---|---|---|---|---|---|---|
| IBMA Level | 0% | 4% | 5% | 6% | 7% | 8% | 12% |
| End Continuity | | | | | | | |
| Initial | 3 | 1.5 | 1.1 | 1.0 | 0.4 | 0.9 | 0.7 |
| After Retort[1] | 19 | 12 | 4.3 | 6.5 | 6.6 | 9.3 | 31 |

[1]90 minutes at 250° F. (121° C.).

Results from Table 13 indicate the optimum level of IBMA in the emulsion monomer composition is around 5%, when used in conjunction with hydroxyl functionality in the acrylic polymer stabilizer.

Example 4

Runs 1-2—Spray Application

The water-based emulsion of Example 3: Run 4 was successfully formulated into a spray applied coating for the interior of beer/beverage aluminum cans. The product was formulated with or without additional surfactant, as described in Table 14.

TABLE 14

Beverage Inside Spray Coating Compositions

Example 4:

| Composition (parts) | Run 1 | Run 2 |
|---|---|---|
| Example 3: Run 4 | 62 | 65 |
| Butanol | 6 | 5 |
| Butyl Cellosolve | 3 | 0 |
| Amyl Alcohol | 1 | 0 |
| Dowanol PNB[1] | 0 | 5 |

TABLE 14-continued

Beverage Inside Spray Coating Compositions

Example 4:

| Composition (parts) | Run 1 | Run 2 |
|---|---|---|
| TERGITOL 15-S-7[2] | 0 | 1 |
| Deionized Water | 28 | 24 |
| Formulation Solids, % | 20 | 21 |
| Viscosity, No. 4 Ford cup | 20 sec | 30 sec |
| VOC, kg/l - H$_2$O | 0.358 | 0.358 |

[1]Commercially available from Dow Chemical.
[2]Commercially available surfactant from Dow Chemical.

These formulations were sprayed at typical laboratory conditions at 120 milligram per can (mg/can) to 130 mg/can coating weight for the application of interior beverage coatings, and cured at 188° C. to 199° C. (measured at the can dome) for 30 seconds through a gas oven conveyor at typical heat schedules for this application. The film properties shown in Table 15 were achieved.

TABLE 15

Inside Spray Film Properties

Example 4:

|  | Run 1 | Run 2 |
|---|---|---|
| Metal Exposures | | |
| Initial | 2 mA | 3 mA |
| After drop damage | 2 mA | 7 mA |
| MEK resistance | <2 | <2 |
| Water retort[1] | | |
| Blush | None | None |
| Adhesion | Excellent | Excellent |
| Global extraction[2] | 0.25 ppm | 3.8 ppm |

[1]90 minutes at 250° F. (121° C.).
[2]2 hours at 150° F. in 90% aqueous ethanol.

The cured films displayed excellent resistance properties and low global extractions despite the fact that their solvent resistance as determined by MEK rubs is low. The higher global extraction result for Example 4: Run 2 was determined to be due to the surfactant present.

Example 4

Runs 3-4—Spray Application

The water-based emulsion of Example 3: Run 4 and Example 3: Run 7 were successfully formulated into spray applied coatings for the interior of beer/beverage aluminum cans. Coating compositions are shown in Table 16.

TABLE 16

Inside Spray Coating Compositions

|  | Example 4: | |
| --- | --- | --- |
| Composition (Parts) | Run 3 | Run 4 |
| Example 3 Run 4 | 62.8 | 0 |
| Example 3 Run 7 | 0 | 62.8 |
| Deionized water | 22.1 | 22.1 |
| Butanol | 5.9 | 5.3 |
| Butyl Cellosolve | 2.9 | 2.9 |
| Amyl alcohol | 1.3 | 1.3 |
| Secondary butanol | 0 | 0.5 |
| Deionized water | 5.0 | 5.1 |
| Dimethyl ethanolamine | As Needed | As Needed |
| Formulation solids | 20.7% | 20.4% |
| Viscosity (No. 4 Ford cup) | 20 sec | 16 sec |

These formulations were sprayed at typical laboratory conditions at 120 mg/can to 130 mg/can (12-ounce) coating weight for the application of interior beverage coatings, and cured at 188° C. to 199° C. (measured at the can dome) for 30 seconds through a gas oven conveyor at typical heat schedules for this application. The film properties shown in Table 17 were achieved, using a commercial epoxy-acrylate coating as a control.

TABLE 17

Inside Spray Film Properties

|  | Waterbased Control[1] | Example 4: Run 3 | Example 4: Run 4 |
| --- | --- | --- | --- |
| Coating weight, mg/can | 124 | 123 | 121 |
| Metal Exposures |  |  |  |
| Initial | 0.9 mA | 2.2 mA | 0.5 mA |
| After drop damage | 1.3 mA | 2.9 mA | 1.2 mA |
| MEK Resistance | 20-50 | 2-5 | <1 |
| Impact on Dome | 10 | 10 | 10 |
| Isopropanol Resistance | >100 | >100 | 5-10 |
| Water retort[2] |  |  |  |
| Blush | 7 | 10 | 10 |
| Adhesion | 10 | 10 | 10 |
| Joy Detergent Test |  |  |  |
| Blush | 7 | 10 | 10 |
| Adhesion | 10 | 10 | 10 |
| Global extractions[3] | <0.1 ppm[4] | <0.1 ppm[4] | <0.1 ppm[4] |

[1]Commercially available inside beverage can coating from Valspar coded 10Q45AF.
[2]90 minutes at 250° F. (121° C.).
[3]2 hours at 150° F. in 90% aqueous ethanol.
[4]Below the current detection limit.

As can be seen in Table 17, the coatings of the present invention compare favorably to the commercial epoxy-acrylate coating, and there is a substantial benefit for retort resistance.

Example 5

Run 1—Beverage End Coil Coating

In a jar with an agitator, 483.25 parts of Example 3: Run 5 emulsion was stirred with 16.75 parts SLIPAYD 404 wax. The mixture was stirred for 10 minutes to make it uniform. The mixture was then filtered. The mixture was approximately 31% solids. The mixture was applied at 7-8 milligrams per square inch (msi) (1.1-1.25 mg/cm²) on ALX Alcoa aluminum and baked for 10 seconds (sec) to achieve a 400° F. (204° C.) peak metal temperature in a coil oven. It was also applied at 7-8 msi (1.1-1.25 mg/cm²) on ALX Alcoa aluminum and baked for 10 seconds to achieve a 435° F. (224° C.) peak metal temperature in a coil oven. Film properties are shown in Table 18.

TABLE 18

Beverage End Film Properties

|  | Waterbased Control[1] | | Example 5 Run 1 | |
| --- | --- | --- | --- | --- |
| Bake | 10 sec to achieve 400° F. (204° C.) | 10 sec to achieve 435° F. (224° C.) | 10 sec to achieve 400° F. (204° C.) | 10 sec to achieve 435° F. (224° C.) |
| MEK Res. | 23 | 35 | 4 | 4 |
| Feathering[2] | 0.500 | 0.193 | 0.018 | 0.010 |
| Dowfax[3] |  |  |  |  |
| Blush | 4 | 9 | 4 | 9 |
| Adhesion | 10 | 10 | 10 | 10 |
| Pasteurization[4] |  |  |  |  |
| Blush | 6 | 9 | 5 | 10 |
| Adhesion | 10 | 10 | 10 | 10 |
| Water Retort[5] |  |  |  |  |
| Blush | 6.5 | 10 | 5.5 | 10 |
| Adhesion | 10 | 10 | 10 | 10 |
| End Continuities | Initial After | Initial After | Initial After | Initial After |
| Pasteurization[4] | 0.13 0.33 | 0.06 0.28 | 2.76 21.35 | 1.5 17.9 |
| Water Retort[5] | 0.016 2.22 | 0.06 0.52 | 4.16 22.9 | 1.4 17.55 |

[1]Commercially available beverage end coating from Valspar coded 13Q80AG.
[2]Performed after a 45 minutes at 85° C. (185° F.) pasteurization. Measured in centimeters.
[3]15 minutes at 100° C. (212° F.).
[4]30 minutes at 85° C. (185° F.).
[5]90 minutes at 121° C. (250° F.).

Example 5

Runs 2-4—Beverage End Coatings

Using the process of Example 5: Run 1, the formulations shown in Table 19 were prepared to investigate the effect of GMA level on end continuities. Each formula was applied at 7-8 msi (1.1-1.25 mg/cm²) on ALX Alcoa aluminum and baked for 10 seconds to achieve a 420° F. (215° C.) peak metal temperature in a coil oven. End continuities are shown in Table 20.

TABLE 19

Effect of GMA Level

|  | Example 5: | | |
| --- | --- | --- | --- |
|  | Run 2 | Run 3 | Run 4 |
| Example 3 Run 5 | 95.7 | 0 | 0 |
| Example 3 Run 34 | 0 | 95.7 | 0 |
| Example 3 Run 35 | 0 | 0 | 95.7 |
| Phenolic[1] | 2.3 | 2.3 | 2.3 |
| SLIPAYD 404 | 1.5 | 1.5 | 1.5 |
| Michem Lube 160 PFE[2] | 0.5 | 0.5 | 0.5 |
| Water/Solvent[3] | To 23% Solids | To 23% Solids | — |
| Deionized Water | — | — | To 23% Solids |

[1]A phenol-formaldehyde phenolic at 50% in water, prepared by reacting 2.3 moles of formaldehyde with 1 mole of phenol.
[2]Commercially available lubricant from Michelman Inc.
[3]1:1 Blend of deionized water and isopropyl alcohol.

TABLE 20

Effect of GMA Level on Beverage End Performance

|  | Example 5: | | |
| --- | --- | --- | --- |
|  | Run 2 | Run 3 | Run 4 |
| GMA Level | 4% | 12% | 20% |
| End Continuities |  |  |  |
| Initial | 2 | 49 | 149 |
| After Retort[1] | 21 | 193 | 304 |

[1]90 minutes at 121° C. (250° F.).

As can be seen by the data in Table 20, lower GMA levels appear to provide better film integrity on fabricated ends, especially after a retort.

Example 5

Run 5—Beverage End Coating

Using the process of Example 5: Run 1, the formulation shown in Table 21 was prepared. The formula was applied at 7-8 milligrams per square inch (msi) (1.1-1.25 mg/cm²) on ALX Alcoa aluminum and baked for 10 seconds to achieve 400° F. (204° C.) and 420° F. (215° C.) peak metal temperatures in a coil oven. Film and end performance properties are shown in Table 22. This material contains 4% GMA and 5% IBMA in the emulsion monomer mix and an acrylic composition with hydroxyl functionality.

TABLE 21

Beverage End Formulation

| Composition | Example 5 Run 5 |
| --- | --- |
| Example 3, Run 38 | 90.80 |
| Dowanol PNP[1] | 2.425 |
| Dowanol DPNB[1] | 2.425 |
| Isooctyl Alcohol | 1.54 |
| Michem Lube 160 PFE | 0.57 |
| Lanco Glidd 5118[2] | 2.24 |
| Solids (%) | 27.5-29.5 |
| Viscosity (No. 4 Ford Cup) | 20 sec-30 sec |

[1]Commercially available from Dow Chemical
[2]Commercially available lubricant from Lubrizol Corp.

TABLE 22

Film Performance of Beverage End Formulation

|  | Water Base Control[1] | | Example 5 Run 5 | |
| --- | --- | --- | --- | --- |
| Bake | 10 sec to achieve 400° F. (204° C.) | 10 sec to achieve 420° F. (215° C.) | 10 sec to achieve 400° F. (204° C.) | 10 sec to achieve 420° F. (215° C.) |
| MEK Res. | 34 | 40 | 10 | 8 |
| Feathering[4] | 0.178 | 0.094 | 0.074 | 0.038 |
| Pencil Hardness | 3H-4H | 3H | HB | HB |
| COF | 0.068 | 0.076 | 0.068 | 0.075 |
| Pasteurization[2] |  |  |  |  |
| Blush | 10 | 10 | 9 | 10 |
| Adhesion | 10 | 10 | 10 | 10 |
| Water Retort[3] |  |  |  |  |
| Blush | 9 | 10 | 8 | 9 |
| Adhesion | 10 | 10 | 10 | 10 |
| End Continuities | Initial / After | | | |
| Pasteurization[2] | 0.0 / 0.1 | 1.1 / 17.6 | 0.5 / 0.7 | 0.5 / 4.3 |
| Water Retort[3] | 0.05 / 0.15 | 1.4 / 11.2 | 0.15 / 0.35 | 0.78 / 10.5 |

[1]Commercially available beverage end coating from Valspar coded 13Q80AG.
[2]30 minutes at 85° C. (185° F.).
[3]90 minutes at 121° C. (250° F.).
[4]Performed after 45 minutes at 85° C. (185° F.) pasteurization. Measured in centimeters.

Results from Table 22 show that a beverage end formulation of the present invention can give similar performance to a commercial epoxy-based waterborne beverage end coating even with lower solvent resistance as measured by MEK double rubs. There is also an added benefit of improved feathering resistance.

Example 6

Latex with Polyester Stabilizer

Example 6 is designed to illustrate the use of a different acid-functional polymer salt as the stabilizer for an emulsion of the present invention.

Stage A

A 2-liter flask was equipped with a stirrer, packed column, Dean Stark trap, reflux condenser, thermocouple, heating mantle and nitrogen blanket. To the flask 700.1 parts dipropylene glycol and 700.1 parts isophthalic acid were added. Under a nitrogen blanket, the contents were heated to 125° C. At 125° C., 1.05 parts FASCAT 4201 was added. The temperature was increased to remove water. At 210° C., water was beginning to collect. After an acid number of 5.2 was obtained, 37 parts of xylene was added to aid in the removal of water. An acid number of 0.9 was obtained, and a portion of the product was used in Stage B.

Stage B

The material from Stage A (599.8 parts) was placed in a 2-liter flask. The temperature was set at 112° C. and 82 parts trimellitic anhydride was added. The material was heated to 232° C., and water was removed. After an acid number of 48.4 was obtained, a portion of the material was used in Stage C.

Stage C

The material from Stage B (198.8 parts) was added to a 2-liter flask, and 40 parts of DOWANOL PNP were added. The material was adjusted to 74° C., and slow addition of deionized water (200 parts) was initiated. After about 30 parts of water were added, 7.6 parts dimethyl ethanolamine were introduced. When about 150 parts of the deionized water were in, heating was halted (the temperature was at 80° C.) and 2.4 parts dimethyl ethanolamine were added. After the entire charge of deionized water was complete, the viscosity was visually high and 200 additional parts deionized water was added. The material was allowed to slowly cool while additional dimethyl ethanolamine was added incrementally to increase the pH to 6.6. The resulting product was 29.7% solids with an acid number of 53.9.

Stage D

A 500-milliliter flask was equipped with a stirrer, reflux condenser, thermocouple, heating mantle, and nitrogen blanket. Into the flask was added 93.2 parts of the Stage C material and 179 parts deionized water. While the contents of the flask were being heated to 50° C. at 240 RPM, 2 drops of HAMP-OL 4.5% Iron and 1.11 parts erythorbic acid were added. In a separate vessel a premix of 28.8 parts styrene, 50.9 BA, 21.0 parts BMA, 5.6 parts IBMA, 4.5 parts GMA and 1.11 parts TRIGONOX A-W70 were premixed. Once the flask was at 52° C., 10% of the premix was added and held for 5 minutes. After 5 minutes, the temperature control was set for 50° C. and the remaining premix was added over 1 hour. When the addition was complete, 15.0 parts deionized water was used to rinse the residual premix into the flask. The batch was then held for 2 hours at temperature, and the batch was cooled. This yielded an emulsion at 34.0% solids, 14.5 acid number, pH of 5.45, and a viscosity 11.5 of seconds (Number 4 Ford Cup).

Stage E

To 50 parts of the emulsion from Stage D, 3.125 parts of a 50/50 blend of ethylene glycol and butyl cellosolve was added. This material was applied to chrome treated aluminum panels and baked for 10 seconds to achieve a 420° F. (217° C.) peak metal temperature. Results from beverage end testing of this example versus a commercial control formula are shown in Table 23.

TABLE 23

|  | Waterbased Control[1] | Example 6 |
|---|---|---|
| MEK Resistance | 22 | 11 |
| Feathering[4] | 0.102 | 0.013 |
| Pasteurization[2] | | |
| Blush | 10 | 9.5 |
| Adhesion | 10 | 10 |
| Water Retort[3] | | |
| Blush | 10 | 10 |
| Adhesion | 10 | 10 |
| End Continuity | | |
| Initial | 1.35 | 0.25 |
| Pasteurization[2] | 2.38 | 1.35 |

[1]Commercially available beverage end coating from Valspar coded 13Q80AG.
[2]30 minutes at 85° C. (185° F.).
[3]90 minutes at 121° C. (250° F.).
[4]Performed after 45 minutes at 85° C. (185° F.) pasteurization. Measured in centimeters.

Example 7

Emulsion for Inside Spray

A 3-liter flask was equipped with a stirrer, reflux condenser, thermocouple, heating mantle, and nitrogen blanket. Into the flask was added 392.2 parts of Example 1: Run 4 acid-functional acrylic, 86.4 parts deionized water, 34.6 parts DMEA, and 1120.8 parts deionized water. The contents of the flask were heated to 70° C. In a separate vessel a premix of 215.8 parts styrene, 302.7 parts butyl acrylate, and 42.0 parts glycidyl methacrylate was prepared. Once the flask was at 70° C., 5.5 parts benzoin and 27.8 parts deionized water was added, followed by 10% of the premix. The flask was heated further to 79° C. and when this temperature was reached, 5.5 parts of 35% hydrogen peroxide and 27.8 parts deionized water were added and held for 5 minutes. The flask was stirred at 210 RPM. After 5 minutes, the temperature control was set at 81° C. and the remaining premix was added over 1 hour. When the addition was complete, 55.9 parts deionized water were used to rinse the residual premix into the flask. The batch was held for 10 minutes and then 0.96 parts benzoin, 55.9 parts deionized water, and 0.95 parts 35% hydrogen peroxide were added. The batch was held for 45 minutes and then 0.31 parts benzoin and 0.31 part 35% hydrogen peroxide were added. After 2 hours the batch was cooled to 45° C. Once at 45° C., 0.46 part of HAMP-OL 4.5% Iron 2.98 parts TRIGONOX A-W70, and a premix of 2.1 parts erythorbic acid, 0.91 parts DMEA, and 18.0 parts deionized water, were added. The batch was held at 45° C. for 1 hour. The material was then cooled to give an emulsion at 31.6% solids, 67.7 acid number, pH of 7.04, and a viscosity of 84 seconds (Number 4 Ford cup).

Example 8

Spray Application

The water-based emulsion of Example 7 was successfully formulated into a spray applied coating for the interior of beer/beverage aluminum cans. The product was formulated as described in Table 24.

TABLE 24

Beverage Inside Spray Coating Composition

| Composition (parts) | Example 8 |
|---|---|
| Example 7 material | 62.8 |
| Deionized Water | 25.3 |
| Butyl Cellosolve | 5.1 |
| Amyl Alcohol | 3.1 |
| Butanol | 0.7 |
| Deionized Water | 3.0 |
| Additional Deionized Water to 18.5% Solids | |
| Formulation Solids, % | 18.5% |
| Viscosity, No. 4 Ford cup | 46 Seconds |

This formulation was sprayed at typical laboratory conditions at 120 mg/can to 130 mg/can coating weight for the application of interior beverage coatings, and cured at 188° C. to 199° C. (measured at the can dome) for 30 seconds through a gas oven conveyor at typical heat schedules for this application. The film properties shown in Table 25 were achieved.

TABLE 25

Inside Spray Film Properties

|  | Water-based Control[1] | Example 8 |
|---|---|---|
| Metal Exposures | | |
| Initial | 2 mA | 1 mA |
| After drop damage | 2 mA | 5 mA |
| Water retort[2] | | |
| Blush | None | None |
| Adhesion | Excellent | Excellent |

[1]Commercially available inside beverage can coating from Valspar coded 10Q45AF.
[2]90 minutes at 250° F. (121° C.)

As can be seen in Table 25, the coatings of the present invention compare favorably to the commercial epoxy-acrylate coating

Example 9

Latex with Polyester-Polyether Stabilizer

Example 9 illustrates the use of a different acid-functional polymer salt as the stabilizer for an emulsion of the present invention.

Stage A

A flask was equipped with a stirrer, packed column, Dean Stark trap, reflux condenser, thermocouple, heating mantle and nitrogen blanket. To the flask, 809.8 parts sebacic acid and 1283.0 parts CHDM-90 (90% 1,4-cyclohexane dimethanol in water) were added. Under a nitrogen blanket, the contents were heated to distill the water from the CHDM-90. While the contents were heated at 165° C., 1.96 parts FASCAT 4100 was added. The temperature was increased to 220° C. to remove water. A sample of the batch was tested and found to have an acid number of 0.5. The remainder of the batch was weighed, and to 1711.7 parts of this material were added 1040.2 parts of para-hydroxy benzoic acid. The batch was heated to 230° C. to remove water. To aid in the removal of water, xylene was added incrementally. After 2 days of water removal, 1.04 parts FASCAT 4100 was added to aid in the reaction. The reaction was held an additional 5 hours and then considered complete. A portion of the product was used in Stage B.

Stage B

The material from Stage A (1915.2 parts) was placed in a flask along with 823.8 parts ERISYS GE-22 (cyclohexanedimethanol diglycidyl ether, 84.8 parts methyl isobutyl ketone (,and 2.63 parts Catalyst 1201 (ethyltriphenyl phosphonium iodide,). The temperature was set at 170° C. and the contents heated. After 3 hours at temperature, the epoxy value of the material was 0.003. The batch was adjusted to have 2684.2 parts of this material in the flask. Added to the flask were 145.0 parts methyl isobutyl ketone and 294.7 parts succinic anhydride. The temperature was maintained at 120-135° C. for 2 hours. After the 2-hour hold, 124.8 parts deionized water and a premix of 214.2 parts DMEA with 265.8 parts deionized water were added. Then 6325.8 parts deionized water was added. The material was cooled resulting in a product with 26.4% solids, an acid number of 71.9, a pH of 7.7, and a viscosity of 15 seconds (Number 4 Ford Cup). This material was used in Stage C.

Stage C

A 5-liter flask was equipped with a stirrer, reflux condenser, thermocouple, heating mantle, and nitrogen blanket. Into the flask was added 1183.4 parts of the Stage B material and 779.6 parts deionized water. A premix of 7.25 parts erythorbic acid, 6.5 parts DMEA, and 76.7 parts deionized water was prepared. This initial premix and 0.18 parts HAMP-OL 4.5% Iron were added to the flask. The contents of the flask were heated to 30° C. In a separate vessel a monomer premix of 249.0 parts styrene, 113.8 BA, 106.7 BMA, 177.8 parts Hydroxy Ethyl Methacrylate (HEMA), 35.6 parts IBMA, and 28.5 parts GMA was prepared. A third premix of 7.25 parts TRIGONOX A-W70 and 82.2 parts deionized water were made. Once all the premixes were prepared and the flask at 30° C., the stirrer was set at 240 RPM and all of the monomer premix was added. The monomer premix vessel was rinsed with 81.6 parts deionized water, which was also added to the flask. The contents of the flask were stirred for 10 minutes, after which 10% of the third premix was added within 1 minute. Once the 10% of the third premix was in, the temperature was increased to 37° C. and the batch was held for 5 minutes. After 5 minutes, the remaining amount of the third premix was added over 45 minutes. The temperature was allowed to increase with no external heat applied. During the addition the maximum temperature was 57° C. After the addition was complete the temperature was 51° C. Temperature control was set for 52° C. The third premix was rinsed with 108.4 parts deionized water and added to the batch. The batch was held for 1.5 hours and then cooled. This yielded an emulsion at 33.1% solids, 27.1 acid number, pH of 7.9, and a viscosity of 12 seconds (Number 4 Ford Cup).

Stage D

To 1473.75 parts of the emulsion from Stage C, 26.25 parts DMEOA were added to increase the pH to 8.6. Using 1330.18 parts of this increased pH material, 89.51 parts ethylene glycol, 16.65 parts dibasic ester, 16.67 parts DOWANOL PM, 5.17 parts xylene, 17.5 parts of a 50% solids solution of a phenol-formaldehyde phenolic, and 24.57 parts MICHEM 160 PFE were added. This formulation was determined to be 30.1% solids, 12 seconds Number 4 Ford viscosity and 8.75 pounds per gallon (1.05 kg/l).

The Stage D composition was applied to non-chrome aluminum panels and baked for 10 seconds to achieve a 420° F. (215° C.) peak metal temperature. A second set was baked for 10 seconds to achieve a 440° F. (227° C.) peak metal temperature. Results from beverage end testing of this example versus a commercial water base and solvent base control formulas are shown in Tables 26 and 27.

TABLE 26

Comparative Testing of Example 9 Stage D Cured at 420° F. (215° C.)

|  | Water-based Control[1] | | Solvent-based Control[2] | | Example 9 Stage D | |
| --- | --- | --- | --- | --- | --- | --- |
| MEK | 44 | | 34 | | 38 | |
| Feathering[3] | 0.0457 | | 0.0457 | | 0.000 | |
| COF Pasteurization[4] | 0.061 | | 0.066 | | 0.063 | |
| Blush | 10 | | 10 | | 8 to 9[6] | |
| Adhesion Water Retort[5] | 10 | | 10 | | 10 | |
| Blush | 10 | | 10 | | 4 to 10[6] | |
| Adhesion | 10 | | 10 | | | |
| End Continuity | Initial | After | Initial | After | Initial | After |
| Pasteurization | 0.08 | 0.12 | 0.0 | 0.30 | 0.0 | 0.5 |
| Water Retort | 0.10 | 0.4 | 0.02 | 0.72 | 0.27 | 1.2 |

[1]Commercially available beverage end coating from Valspar coded 13Q80AG.
[2]Commercially available beverage end coating from Valspar coded 92X205S.
[3]Performed after 45 minutes at 85° C. (185° F.) pasteurization. Measured in centimeters (cm).
[4]30 minutes at 85° C. (185° F.).
[5]90 minutes at 121° C. (250° F.).
[6]Initial Blush seen which improves within 5 minutes.

TABLE 27

Comparative Testing of Example 9 Stage D Cured at 440° F. (227° C.)

|  | Water-based Control[1] | Solvent-based Control[2] | Example 9 Stage D |
| --- | --- | --- | --- |
| MEK | 52 | 37 | 40 |
| Feathering[3] | 0.0559 | 0.0356 | 0.000 |
| COF Pasteurization[4] | 0.059 | 0.065 | 0.063 |
| Blush | 10 | 10 | 8 to 10[6] |
| Adhesion | 10 | 10 | 10 |

TABLE 27-continued

Comparative Testing of Example 9 Stage D Cured at 440° F. (227° C.)

| Water Retort[5] | | | | | | |
|---|---|---|---|---|---|---|
| Blush | 10 | | 10 | | 6 to 10[6] | |
| Adhesion | 10 | | 10 | | | |
| End Continuity | Initial | After | Initial | After | Initial | After |
| Pasteurization | 0.0 | 0.48 | 0.07 | 0.23 | 0.1 | 0.8 |
| Water Retort | 0.05 | 0.4 | 0.25 | 1.5 | 0.35 | 0.8 |

[1]Commercially available beverage end coating from Valspar coded 13Q80AG.
[2]Commercially available beverage end coating from Valspar coded 92X205S.
[3]Performed after 45 minutes at 85° C. (185° F.) pasteurization. Measured in cm.
[4]30 minutes at 85° C. (185° F.).
[5]90 minutes at 121° C. (250° F.).
[6]Initial Blush seen which improves within 5 minutes.

Example 10

Example 10 illustrates the use of a different acid-functional polymer salt as the stabilizer for an emulsion of the present invention.

Stage 1

Approximately 1055 parts BPA is placed in a flask along with approximately 1684 parts of liquid epoxy resin (EPON 828), 85 parts methyl isobutyl ketone, and 2 to 3 parts Catalyst 1201. The temperature is set at 160° C. and the contents are then heated for approximately 3 hours to achieve an epoxy value of the material of approximately 0.003. The batch is then adjusted to have 2684.2 parts of this material in the flask. Added to the flask is 145.0 parts methyl isobutyl ketone and 294.7 parts succinic anhydride. The temperature is maintained at 120-135° C. for 2 hours. After the 2-hour hold, 124.8 parts deionized water and a premix of 214.2 parts DMEA with 265.8 parts deionized water is added. Then 6325.8 parts deionized water is added. The material is cooled, and should result in a product with target values of 26% to 27% solids, an acid number of approximately 72, a pH of approximately 7 to 9, and a Number 4 Ford viscosity of 15 Seconds. This material is used in Stage 2.

Stage 2

A 5-liter flask is equipped with a stirrer, reflux condenser, thermocouple, heating mantle, and nitrogen blanket. Into the flask is added approximately 1183 parts of the Stage 1 material and 780 parts deionized water. A premix of 7.25 parts erythorbic acid, 6.5 parts DMEA, and 77 parts deionized water is prepared. This initial premix and 0.18 parts HAMPOL 4.5% Iron are added to the flask. The contents of the flask are heated to 30° C. In a separate vessel a monomer premix of 249 parts styrene, 114 BA, 107 parts BMA, 178 parts HEMA, 36 parts IBMA, and 28 parts GMA is prepared. A third premix of 7.25 parts TRIGONOX A-W70 and 82.2 parts deionized water is made. Once all the premixes are prepared and the flask is at 30° C., the stirrer is set at 240 RPM and all of the monomer premix is added. The monomer premix vessel is rinsed with 82 parts deionized water, which is also added to the flask. The contents of the flask are stirred for 10 minutes, after which 10% of the third premix is added within 1 minute. Once the 10% is in the temperature is increased to 37° C. The batch is held for 5 minutes. After 5 minutes, the remaining amount of the third premix is added over 45 minutes. The temperature is allowed to increase with no external heat applied. During the addition, the maximum temperature is 57° C. After the addition is complete, the temperature is set for 52° C. The third premix is rinsed with 109 parts deionized water and added to the batch. The batch is held for 1.5 hours and cooled. This process should yield an emulsion with a target of approximately 33% solids, 27 acid number, pH of 8, and a viscosity of 12 seconds (Number 4 Ford Cup).

Stage 3

To 1474 parts of the emulsion from Stage 2, 26.25 parts DMEOA is added to increase the pH to 8.6. Using 1330.18 parts of this increased pH material, 89.51 parts ethylene glycol, 16.65 parts dibasic ester, 16.67 parts Dowanol PM, 5.17 parts xylene, 17.5 parts of a 50% solids solution of a phenol-formaldehyde phenolic, and 24.57 parts Michem 160 PFE is added. This formulation should yield a composition having approximately 30% solids.

The Stage 3 composition may be applied to non-chrome aluminum panels and baked for 10 seconds to achieve a 217° C. peak metal temperature.

Example 11

Stage 1: Preparation of Acrylic Alkali Soluble Support Polymer 667.6 grams of n-butanol and 33.2 grams of deionized water are charged to a 5-liter flask equipped with a stirrer, an inert gas inlet, a condenser, and a port for the addition of a monomer feed. This mixture was then heated to 97° C. to 100° C. under a nitrogen blanket. Next, a mixture (hereinafter "monomer premix") of 853.3 grams of glacial methacrylic acid, 858.8 grams of styrene, 474.0 grams of ethyl acrylate, 63.7 grams of deionized water, and 575.1 grams of n-butanol was prepared. Another premix (hereinafter "initiator premix 1") was made in a separate container consisting of 316.3 grams of n-butanol and 113.7 grams of Luperox 26 (tert-butyl-peroxy-2-ethylhexenoate). Another premix (hereinafter "initiator premix 2") consisting of 8.2 grams of n-butanol and 17.6 grams of Luperox 26 was prepared. When the reactor temperature was steady at 97° C. to 100° C., initiator premix 2 was charged to the reaction flask and the monomer premix and initiator premix 1 feeds were then simultaneously started and fed into the reactor over a time period of 2.5 hours. When the feeds were complete, the flask and feed lines containing initiator feed one were rinsed with 16.4 grams of n-butanol, then another initiator premix (hereinafter "initiator premix 3") composed of 29.7 grams of n-butanol and 22.5 grams of Luperox 26 was started and fed into the reactor over the course of 1 hour. Temperature was maintained at 97° C. to 100° C. during this feed. When this feed was complete, the initiator flask and lines were rinsed with 16.4 grams of n-butanol and the batch was held at 97° C. to 100° C. for 30 minutes. Following this hold period, a final premix of 4.9 grams of Luperox 26 and 0.4 grams of n-butanol was added to the reaction flask. The batch was then held at 97° C. to 100° C. for 2 more hours. Following this hold period, 18.0 grams of deionized water were added to the batch and the batch was cooled and poured.

Stage 2: Preparation of Emulsion Polymerized Latex Polymer 163.3 grams of the polymer described above in Stage 1 was added to a reaction flask equipped with a stirrer, a condenser, an inlet port for material additions, and an inert gas inlet. At ambient temperature, under a nitrogen blanket and with agitation, 14.4 grams of dimethylethanolamine was added to the reaction flask and the resulting mixture was mixed until uniform. Next, 489.4 grams of deionized water were added to the flask and the material was heated to reflux to ensure a homogeneity. After the material was homogenous, the mixture was cooled to 40° C. The following monomer mixture was then added to the reaction flask: 89.9 grams of styrene, 126.1 grams of n-butyl acrylate, and 17.5 grams of glycidyl methacrylate. The temperature of the flask was allowed to drop. After mixing for approximately 30 minutes, 10.0 grams of deionized water and 0.4 grams of tert-butyl hydroperoxide were added to the reaction flask. Next, a premix of 0.3 grams of erythorbic acid, 0.3 grams of dimethylethanolamine, 0.025 grams of a 6.17% aqueous solution of sodium feredetate, and 25.0 grams of deionized water was fed into the reactor over 15 to 20 minutes. During this feed the acrylic monomers began to polymerize exothermically and the temperature was maintained above 60° C. for one hour to ensure high conversion of monomer to polymer. After this hold period, 77.4 grams of deionized water were added to the batch and the batch was cooled and poured. The molecular weight of the resulting latex polymer was determined by gas permeation chromatography. This data is reported below in Table 28.

TABLE 28

| | Mw | Mn | Mp | Mw/Mn | % Area |
|---|---|---|---|---|---|
| Peak 1 | 679,960 | 361,490 | 556,920 | 4.32 | 76 |
| Peak 2 | 13,720 | 8,810 | 15,210 | 1.56 | 24 |

It is believed that peak 1 represents the "batch" polymerized latex component of the polymer and that peak 2 represents the alkali soluble support polymer.

Example 11

Coating A

In a jar with an agitator, 100 parts of the Example 11, stage 2 emulsion was stirred with 1.3 parts Michem Lube 160 PF carnauba wax emulsion (available from Michelman, Cincinnati, Ohio, USA). The mixture was stirred for 10 minutes to make it uniform. The mixture was then filtered. The mixture was approximately 32 wt-% solids. The mixture was applied at 6-7 milligrams per square inch (msi) (0.94-1.10 mg/cm$^2$) on ALX Alcoa aluminum and baked for 10 seconds to achieve a 425° F. (218° C.) peak metal temperature (PMT) in a coil oven.

Example 11

Coating B

In a jar with an agitator, 100 parts of Example 11, stage 2 emulsion was stirred with 1.3 parts Michem Lube 160 PF carnauba wax emulsion and 2.6 parts Durez 33870 phenolic resin (available from Durez Corp., Addison, Tex., USA). The mixture was prepared, cured, and applied to substrate as described above for Coating A.

The coated substrate samples of Coatings A and B were tested alongside a commercial epoxy-acrylate beverage end coating to assess coating properties. This data is presented below in Table 29.

TABLE 29

Beverage End Film Properties

| | Epoxy-Acrylate Control | Example 11 Coating A | Example 11 Coating B |
|---|---|---|---|
| Film Weight | 7.9 msi (1.22 mg/cm$^2$) | 6.7 msi (1.04 mg/cm$^2$) | 6.4 msi (0.99 mg/cm$^2$) |
| MEK Resistance[1] | >100 | ~2 | 8 |
| Feathering[2] | 0.038 | 0.004 | 0 |

TABLE 29-continued

Beverage End Film Properties

| | Epoxy-Acrylate Control | Example 11 Coating A | Example 11 Coating B |
|---|---|---|---|
| Dowfax[3] | | | |
| Blush | 7 | 6T[6] | 7T |
| Adhesion | 10 | 10 | 10 |
| Water Process[4] | | | |
| Blush (in water/above water in vapor) | 9/10 | 7/7T | 4/10T |
| Adhesion (in water/above water in vapor) | 10/10 | 10/10 | 10/10 |
| Coffee Process[5] | | | |
| Stain | 2 | 8 | 8 |
| Blush | 5 | 8 | 8 |
| Adhesion | 0 | 10 | 10 |
| End Continuities | | | |
| Initial | N/A | 0.5 mA | 0.3 mA |
| After Dowfax | N/A | 7.2 mA | 3.0 mA |

[1]Number of double rubs required to remove the coating using an MEK soaked rag
[2]Performed after 45 minutes at 85° C. pasteurization, measured in inches.
[3]15 minutes at 100° C. in 0.19% aqueous solution of Dowfax 2A1
[4]90 minutes at 121° C.
[5]60 minutes at 121° C.
[6]In Table 29 "T" stands for transient, meaning that the blush was temporary and the appearance recovered after the sample was removed from the test.

Example 12

Polyurethane Dispersion

Stage 1: Urethane Prepolymer

To a 2-liter flask equipped with a stirrer, a condenser, a gas inlet, and a thermocouple, the following materials were charged:
 159.15 grams of Stepanpol PS-70L polyester (Stepan Corp., Northfield, Ill., USA)
 53.04 grams of Terathane 2000 (Invista Corp., Wichita, Kans., USA)
 42.67 grams of dimethylol propionic acid
 151.36 grams of dicyclohexylmethane 4,4'-diisocyanate
 155.49 grams of methyl methacrylate
 75.32 grams of dipropyleneglycol dimethyl ether
 0.64 grams butylated hydroxytoluene The mixture was then heated with an air sparge to 88° C. and held at temperature for approximately 3 hours, after which substantially all of the hydroxyl groups had been reacted with isocyanate and an isocyanate terminated prepolymer was formed. The prepolymer was then cooled to 60° C. and neutralized with 32.16 grams of triethylamine Stage 2: Dispersion In a separate reactor, 1001.57 grams of deionized water and 75.32 grams of dipropylene glycol dimethylether were chilled to 10° C. The urethane prepolymer of stage 1 was then dispersed into this mixture of solvent and water with good agitation over the course of about 15 minutes. After all of the prepolymer had been dispersed, a mixture of 7.88 grams of ethylenediamine and 40.17 grams of deionized water was added to the reactor to chain extend the dispersed polyurethane prepolymer.

Stage 3: Acrylation

After 45 minutes of mixing following the chain extension add, a premix of 214.05 grams of n-butyl acrylate and 45.21 grams of glycidyl methacrylate was added to the reactor followed by 40.17 grams of deionized water. The contents of the reactor were mixed for 10 minutes. Next, 1.45 grams of a 70% aqueous solution of tert-butyl hydroperoxide was added to the reactor. After this addition, a premix of 43.61 grams of deionized water, 1.07 grams of erythorbic acid, 1.20 grams of triethylamine, and 0.06 grams of a 6.17% aqueous solution of sodium feredetate was fed into the reactor over the course of about 15 minutes. An exotherm of approximately 30 to 35° C. occurred during this add as the methylmethacrylate, n-butyl acrylate, and glycidyl methacrylate were polymerized. 10.91 grams of water were then added to rinse the addition funnel and the batch was cooled and poured. The resulting polymer dispersion had a solids content of about 37.9 wt-%, a pH of about 8.3, and a viscosity of 18,000 to 19,000 centipoise.

Example 12

Coating Composition

In a jar with an agitator, 100 parts of the Example 12 dispersion was stirred with 1.6 parts Michem Lube 160 PF carnauba wax emulsion (available from Michelman, Cincinnati, Ohio, USA) and 4.03 grams of a phenol-formaldehyde crosslinker. The mixture was stirred for 10 minutes to make it uniform. The mixture was then filtered. The mixture was approximately 38.2 wt-% solids. The mixture was applied at 6-7 msi (0.94-1.10 mg/cm$^2$) on ALX Alcoa aluminum and baked for 10 seconds to achieve a 465° F. (241° C.) peak metal temperature (PMT) in a coil oven.

The cured films of this material displayed performance characteristics with respect to beverage end applications similar to that of a commercial epoxy acrylate control.

The instant application is filed on even date with U.S. application Ser. No. 12/505,236, now U.S. Patent No. 8,092,876, entitled COATING COMPOSITIONS FOR CANS AND METHODS OF COATING and U.S. application Ser. No. 12/505,255 entitled COATING COMPOSITIONS FOR CANS AND METHODS OF COATING, each of which claims priority to U.S. application Ser. No. 11/253,161 and is incorporated herein by reference.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. An article, comprising:
   a body portion or end portion of a food or beverage can comprising a metal substrate; and
   a coating composition disposed on an inside surface thereon comprising an emulsion polymerized latex polymer that (i) is substantially free of bound bisphenol A and aromatic glycidyl ether compounds and (ii) comprises the reaction production of an ethylenically unsaturated monomer component batch polymerized in the presence of an aqueous dispersion of a polymer salt, wherein the ethylenically unsaturated monomer component comprises a mixture of monomers that includes at least one oxirane functional group-containing monomer.

2. The article of claim 1, wherein the coating composition is disposed on a beverage can end.

3. The article of claim 1, wherein the polymer salt is present in the coating composition in an amount comprising at least 5 wt-%, based on the total weight of the ethylenically unsaturated monomer component and the polymer salt.

4. The article of claim 1, wherein the polymer salt comprises an acid- or anhydride-functional acrylic polymer, acid- or anhydride-functional alkyd resin, acid- or anhydride-functional polyester resin, acid- or anhydride-functional polyurethane, or a combination thereof.

5. The article of claim 1, wherein the polymer salt comprises a salt of an acrylic polymer.

6. The article of claim 1, wherein the emulsion polymerized latex polymer includes at least 25 wt-% of the ethylenically unsaturated monomer component, based on the total weight of the ethylenically unsaturated monomer component and the polymer salt.

7. The article of claim 1, wherein at least 40 wt-% of the ethylenically unsaturated monomer component comprises an alkyl acrylate, a methacrylate, or a combination thereof.

8. The article of claim 1, wherein the emulsion polymerized latex polymer is epoxy-free.

9. The article of claim 1, wherein the coating composition is substantially free of bound bisphenol A and aromatic glycidyl ether compounds.

10. The article of claim 1, wherein the coating composition, when present on a beverage can end at a dry film thickness of 7 milligrams per square inch, passes less than 10 milliamps of current after being exposed for 4 seconds to a room-temperature electrolyte solution containing 1% by weight of NaCl dissolved in water.

11. The article of claim 1, wherein the ethylenically unsaturated monomer component comprises 0.1 wt-% to 30 wt-% of an oxirane-functional alpha, beta-ethylenically unsaturated monomer with the aqueous dispersion, based on the weight of the monomer component.

12. The article of claim 1, wherein the polymer salt comprises a salt of an acid- or anhydride-functional polyurethane and a tertiary amine.

13. The article of claim 1, wherein the coating composition is disposed on an interior surface of a beverage can end.

14. The article of claim 1, wherein the batch polymerized ethylenically unsaturated monomer component has a number average molecular weight of 100,000 or more.

15. The article of claim 1, wherein the batch polymerized ethylenically unsaturated monomer component has a number average molecular weight of 300,000 or more.

16. The article of claim 1, wherein the polymer salt comprises a salt of an acid- or anhydride-functional polymer.

17. The article of claim 16, wherein the polymer salt comprises a salt of an acid- or anhydride-functional polymer and an amine.

18. The article of claim 1, wherein the polymer salt comprises a salt of a polyurethane polymer.

19. The article of claim 18, wherein the polymer salt comprises a salt of a polyurethane polymer and an amine.

20. The article of claim 1, wherein the ethylenically unsaturated monomer component is batch polymerized in the presence of the aqueous dispersion with a water-soluble free radical initiator at a temperature of 0° C. to 100° C.

21. The article of claim 20, wherein the free radical initiator comprises a redox initiator.

* * * * *